US012708986B2

(12) United States Patent
Gilsinger et al.

(10) Patent No.: US 12,708,986 B2
(45) Date of Patent: Aug. 18, 2026

(54) POWERED RATCHET TOOL

(71) Applicant: MILWAUKEE ELECTRIC TOOL CORPORATION, Brookfield, WI (US)

(72) Inventors: Jordan P. Gilsinger, Sussex, WI (US); Jacob P. Schneider, Cedarburg, WI (US); Kyle A. Marten, Plymouth, WI (US); Rick D. Marcusen, Hortonville, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 378 days.

(21) Appl. No.: 18/132,248

(22) Filed: Apr. 7, 2023

(65) Prior Publication Data

US 2023/0321797 A1 Oct. 12, 2023

Related U.S. Application Data

(60) Provisional application No. 63/352,673, filed on Jun. 16, 2022, provisional application No. 63/328,495, filed on Apr. 7, 2022.

(51) Int. Cl.
*B25B 21/00* (2006.01)

(52) U.S. Cl.
CPC .................................. *B25B 21/004* (2013.01)

(58) Field of Classification Search
CPC ... B25B 21/004; B25B 23/0028; B25F 5/001; B25F 5/02; B25G 1/063
See application file for complete search history.

(56) References Cited

U.S. PATENT DOCUMENTS 4,347,450 A 8/1982 Colligan
5,784,934 A 7/1998 Izumisawa
D439,485 S 3/2001 Izumisawa
(Continued)

FOREIGN PATENT DOCUMENTS

DE 10318563 A1 3/2004
DE 102005021153 A1 11/2006
(Continued)

OTHER PUBLICATIONS

Extended European Search Report for Application No. 23167122.3 dated Jul. 26, 2023 (10 pages).

*Primary Examiner* — David B. Thomas
(74) *Attorney, Agent, or Firm* — Michael Best & Friedrich LLP

(57) ABSTRACT

A powered ratchet tool includes a housing with a battery receptacle, a motor within the housing with an output spindle driven about a first axis, a battery configured to be coupled to the battery receptacle to power the motor, a head pivotably coupled to the housing and configured to pivot with respect to the housing about a second axis perpendicular to the first axis and between a plurality of discrete orientations, the head including a ratchet mechanism driven by the output spindle and an output drive coupled to the ratchet mechanism and configured to rotate about an output drive axis, and a locking mechanism moveable between a first position, in which the head is locked in one of the plurality of discrete orientations with respect to the housing, and a second position, in which the head freely pivots between the plurality of discrete orientations about the second axis.

18 Claims, 22 Drawing Sheets

(56) References Cited

U.S. PATENT DOCUMENTS

| | | | | |
|---|---|---|---|---|
| D439,486 | S | 3/2001 | Izumisawa | |
| D440,847 | S | 4/2001 | Izumisawa | |
| D440,848 | S | 4/2001 | Izumisawa | |
| 6,311,583 | B1 | 11/2001 | Izumisawa | |
| 6,435,060 | B1 | 8/2002 | Izumisawa | |
| 6,490,953 | B2 | 12/2002 | Horvath | |
| 6,928,902 | B1 * | 8/2005 | Eyssallenne | B25F 5/02 81/57.44 |
| 7,055,622 | B2 | 6/2006 | Bone | |
| 7,104,165 | B2 * | 9/2006 | Chu | B25G 1/063 81/177.85 |
| 7,156,187 | B1 * | 1/2007 | Townsan | B25B 21/002 173/217 |
| 7,281,591 | B2 | 10/2007 | Bone | |
| 7,481,135 | B2 | 1/2009 | Schoenbeck et al. | |
| 7,509,894 | B2 * | 3/2009 | Chen | B25B 21/00 81/177.9 |
| 7,549,913 | B2 | 6/2009 | Weiford et al. | |
| 7,722,444 | B2 | 5/2010 | Gallagher et al. | |
| 7,735,398 | B2 * | 6/2010 | Hsu | B25B 21/004 81/57.39 |
| 7,887,395 | B2 | 2/2011 | Weiford et al. | |
| 7,942,426 | B2 | 5/2011 | Peters | |
| 8,087,976 | B2 | 1/2012 | Gallagher et al. | |
| 8,087,977 | B2 | 1/2012 | Gallagher et al. | |
| 8,117,950 | B2 | 2/2012 | Kozak et al. | |
| 8,292,700 | B2 | 10/2012 | Gallagher et al. | |
| 8,480,453 | B2 | 7/2013 | Kobayashi | |
| 8,716,618 | B2 | 5/2014 | Gallagher, Sr. et al. | |
| 8,789,447 | B2 | 7/2014 | Kozak | |
| 9,205,542 | B2 | 12/2015 | Dedrickson | |
| 9,289,885 | B2 | 3/2016 | Kobayashi | |
| 9,623,487 | B2 | 4/2017 | Kozak | |
| 9,956,676 | B2 | 5/2018 | Wong et al. | |
| 10,717,174 | B2 * | 7/2020 | Chien | B25B 13/461 |
| 2005/0051002 | A1 | 3/2005 | Brun | |
| 2005/0211026 | A1 | 9/2005 | Cheng | |
| 2007/0084310 | A1 | 4/2007 | Kobayashi | |
| 2007/0084616 | A1 | 4/2007 | Lam et al. | |
| 2007/0234854 | A1 | 10/2007 | Collins | |
| 2008/0087449 | A1 | 4/2008 | Lam et al. | |
| 2008/0178709 | A1 | 7/2008 | Chen | |
| 2010/0064860 | A1 | 3/2010 | Kozak et al. | |
| 2011/0036209 | A1 | 2/2011 | Hung | |
| 2016/0144491 | A1 * | 5/2016 | Huddy | B25B 23/0028 81/177.8 |
| 2019/0084133 | A1 | 3/2019 | Hafele et al. | |
| 2021/0146512 | A1 | 5/2021 | Andersson | |
| 2021/0187723 | A1 | 6/2021 | Andersson | |
| 2021/0331300 | A1 | 10/2021 | Schulz | |
| 2022/0324086 | A1 | 10/2022 | Beer | |
| 2022/0379444 | A1 | 12/2022 | Beer | |
| 2023/0339081 | A1 * | 10/2023 | Zheng | B25B 23/0028 |
| 2024/0017383 | A1 | 1/2024 | Beer | |

FOREIGN PATENT DOCUMENTS

| | | | |
|---|---|---|---|
| EP | 1186381 | A1 | 5/2007 |
| WO | 2007056172 | A1 | 5/2007 |

* cited by examiner

POWERED RATCHET TOOL

CROSS-REFERENCE TO RELATED APPLICATIONS

The present application claims priority to U.S. Provisional Patent Application No. 63/328,495 filed on Apr. 7, 2022, and U.S. Provisional Patent Application No. 63/352,673 filed on Jun. 16, 2022, the entire contends of all of which are incorporated herein by reference.

FIELD

The present disclosure relates to power tools, and more particularly to powered ratchet tools.

BACKGROUND

Powered ratchet tools may be driven in a forward direction or an opposite direction to apply torque to a fastener for tightening and loosening operations. Powered ratchet tools are typically powered by an electrical source, such as a DC battery, a conventional AC source, or pressurized air.

SUMMARY

The present disclosure provides, in one aspect, a powered ratchet tool including a housing with a battery receptacle, a motor disposed within the housing, the motor including an output spindle driven by the motor about a first axis, a battery configured to be coupled to the battery receptacle to power the motor, a head pivotably coupled to the housing, the head configured to pivot with respect to the housing about a second axis perpendicular to the first axis and between a plurality of discrete orientations, the head including a ratchet mechanism driven by the output spindle, and an output drive coupled to the ratchet mechanism and configured to rotate about an output drive axis, and a locking mechanism moveable between a first position, in which the head is locked in one of the plurality of discrete orientations with respect to the housing, and a second position, in which the head freely pivots between the plurality of discrete orientations about the second axis.

The present disclosure provides, in another aspect, a powered ratchet tool including a housing having a motor housing portion and a gear housing portion, and a motor disposed within the motor housing portion. The motor including an output spindle driven by the motor about a first axis. The powered ratchet tool further includes a head pivotably coupled to the gear housing portion. The head is configured to pivot with respect to the gear housing portion about a second axis perpendicular to the first axis. The head includes a ratchet mechanism driven by the output spindle and an output drive coupled to the ratchet mechanism. The output drive is configured to rotate about an output drive axis. Moreover, the powered ratchet tool includes a gear assembly disposed in the gear housing portion. The gear assembly is configured to transmit torque from the motor to the ratchet mechanism to rotate the output drive. In addition, the powered ratchet tool includes a collar disposed around the gear housing portion. The collar configured is to engage the head to lock the head at a first discrete orientation with respect to the gear housing portion.

The present disclosure provides, in another aspect, a method of locking a head of a powered ratchet tool in a discrete orientation with respect to a housing of the powered ratchet tool. The head is configured to pivot with respect to the housing between a plurality of discrete orientations. The powered ratchet tool further includes a locking mechanism including a collar disposed around the housing and movable between a first position and a second position. The method includes a step of biasing the collar into the first position to engage the head to lock the head at a first of the discrete orientations with respect to the housing. The method also includes a step of moving the collar from the first position to the second position to disengage the head and allow the head to freely pivot with respect to the housing. The method also includes a step of pivoting the head to a second of the discrete orientations with respect to the housing. The method also includes moving the collar from the second position to the first position such that the collar engages the head to lock the head at the second of the discrete orientations with respect to the housing.

Other features and aspects of the disclosure will become apparent by consideration of the following detailed description and accompanying drawings.

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways.

DETAILED DESCRIPTION

Figure 1:
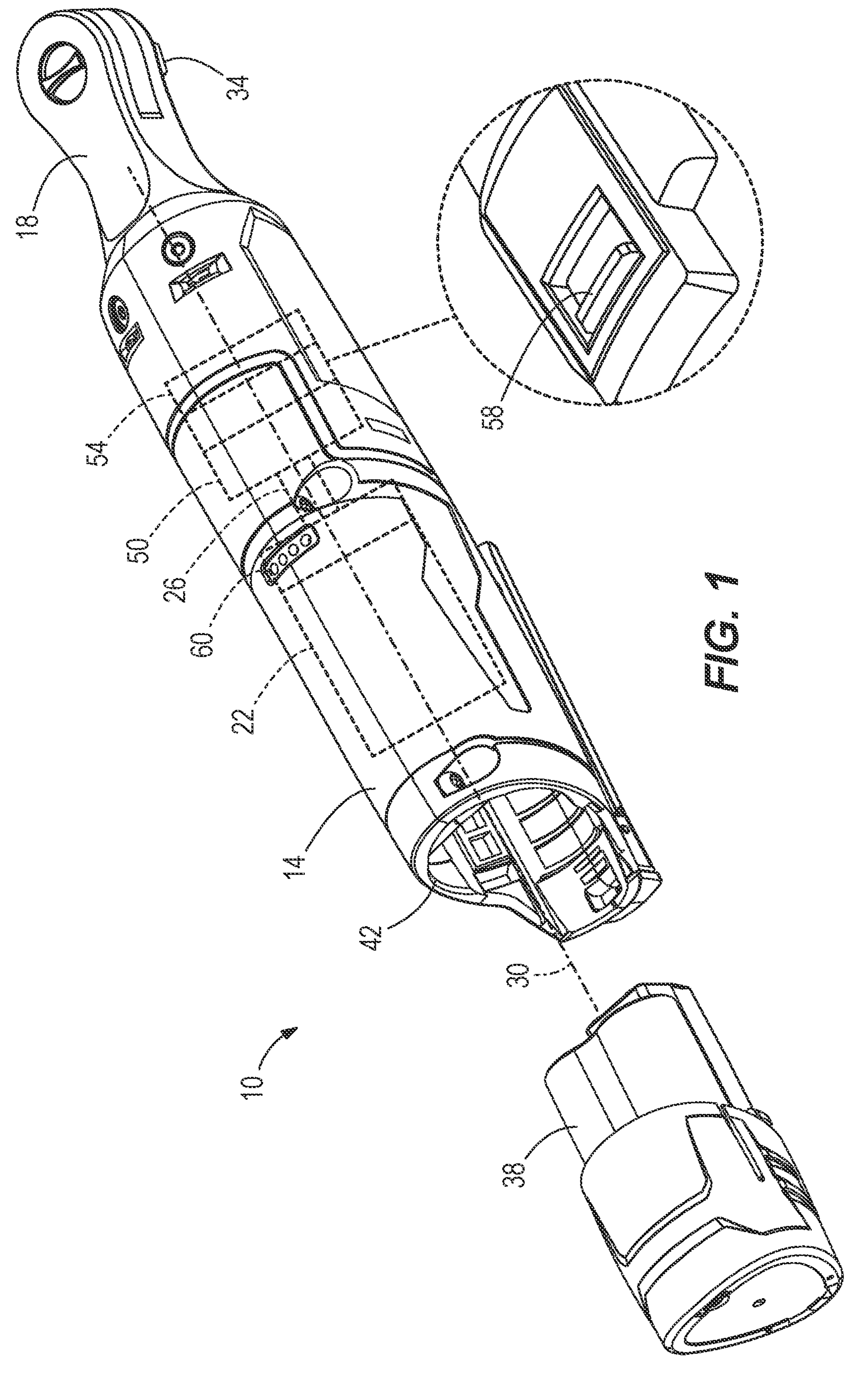
FIG. 1 is a perspective view of a powered ratchet tool according to a first embodiment.

With reference to FIG. 1, a powered ratchet tool 10 in accordance with an embodiment of the disclosure includes a housing 14 and a head 18 coupled to and extending from the housing 14. A motor 22 is supported within the housing 14 and has an output shaft 26 rotatable about a first axis 30. The motor 22 is configured to provide torque to an output drive 34 rotatably supported by the head 18 for rotation about an axis perpendicular to the first axis 30. The motor 22 is preferably a brushless DC motor. In some embodiments, the motor 22 is a surface permanent magnet (SPM) motor including a stator, a rotor, and permanent magnets affixed to or embedded in an exterior surface of the rotor. In other embodiments, the motor 22 is an outer rotor motor, having a rotor that surrounds and rotates about the stator.

In the illustrated embodiment, the ratchet tool 10 includes a battery pack 38 received by a battery receptacle 42 formed in the housing 14 opposite the head 18. The battery receptacle 42 electrically connects the battery pack to the motor 22 (via suitable electrical and electronic components, such as a PCBA containing MOSFETs, IGBTs, or the like). The battery pack 38 may be a 12-volt power tool battery pack that includes three lithium-ion battery cells. Alternatively, the battery pack 38 may include fewer or more battery cells to yield any of a number of different output voltages (e.g., 14.4 volts, 18 volts, etc.). Additionally or alternatively, the battery cells may include chemistries other than lithium-ion such as, for example, nickel cadmium, nickel metal-hydride, or the like.

With continued reference to FIG. 1, the output drive 34 is operably coupled to the output shaft 26 of the motor 22 via a gear assembly or transmission 50. The transmission 50 is preferably a multi-speed (e.g., two-speed) transmission having at least a high-speed, low-torque state, and a low-speed, high-torque state. For example, in the illustrated embodiment, the transmission 50 is a planetary transmission including a movable ring gear 54. The movable ring gear 54 is shiftable along the first axis 30 via a shift actuator 58, coupled to the movable ring gear 54 by a spring arm (not shown) or any other suitable arrangement for shifting the movable ring gear 54. In the high-speed, low-torque state, the movable ring gear 54 is unlocked relative to the housing 14, allowing rotation of the ring gear 54. In the low-speed, high-torque state, the movable ring gear 54 is locked and prevented from rotating. In other embodiments, the ring gear 54 may be axially fixed, and the shift actuator 58 may be coupled to a movable locking ring, movable into or out of engagement with the ring gear 54 to selectively prevent or allow rotation of the ring gear 54.

In the illustrated embodiment, the ratchet tool 10 further includes a flywheel 60 for increasing a rotational inertia of the drivetrain. The flywheel 60 may be positioned at any point along the drivetrain between the motor 22 and the output drive 34. In some embodiments, a high-density fan (e.g., made of metal such as zinc or any other suitable high-density material) may be coupled to the output shaft 26 of the motor 22 to act both as a cooling air generator and the flywheel 60. In embodiments in which the motor 22 is an outer rotor motor, mass may be added to the outer rotor in order to increase the rotational inertia of the drivetrain.

Figure 2:
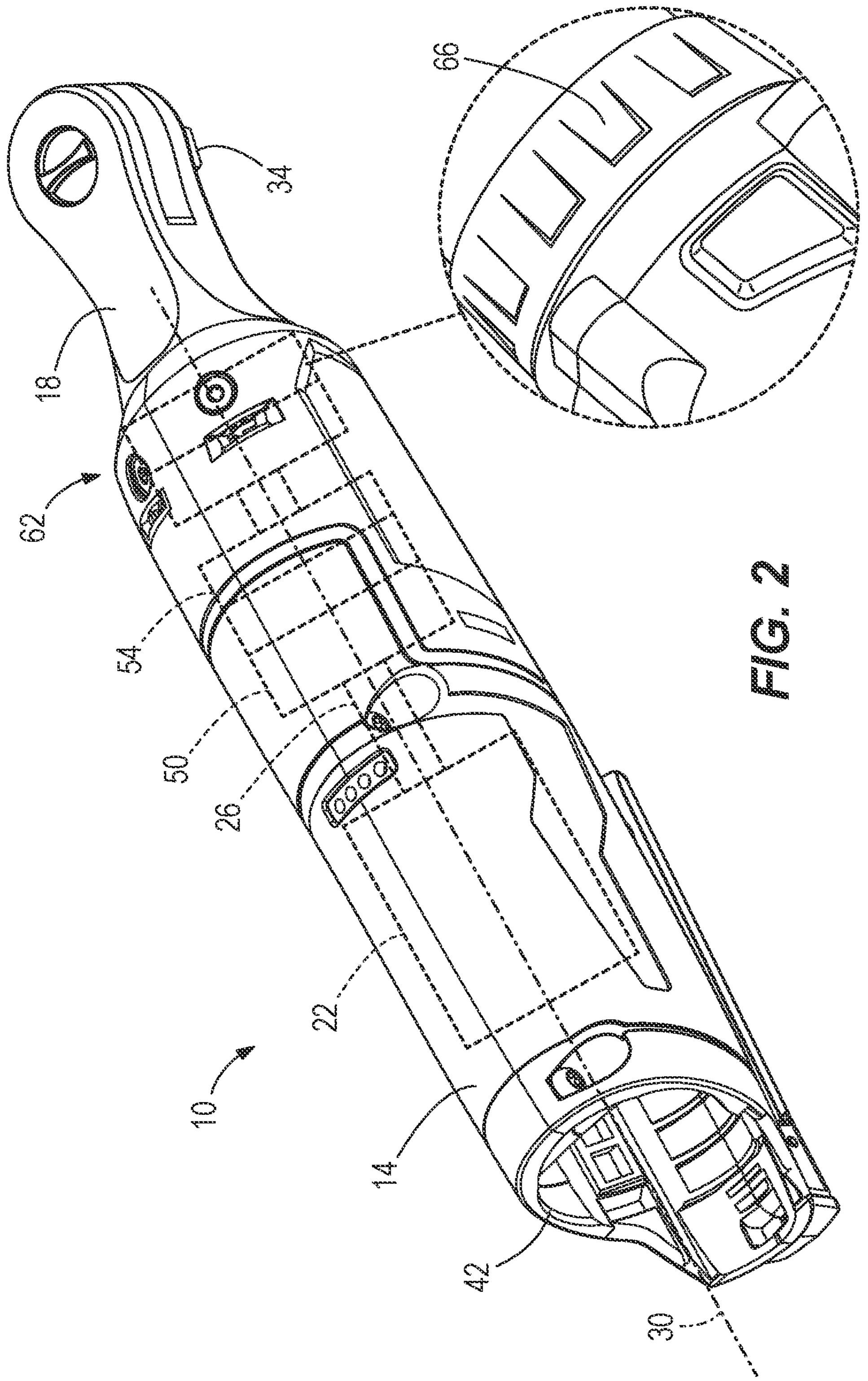
FIG. 2 is a perspective view of the powered ratchet tool of FIG. 1 illustrating a clutch mechanism.

Referring to FIG. 2, in some embodiments, the ratchet tool 10 may include a clutch mechanism 62 operably coupled between the output shaft 26 of the motor 22 and the output drive 34. In the illustrated embodiment, the clutch mechanism 62 is coupled between the transmission 50 and the output drive 34; however, in other embodiments, the clutch mechanism 62 may be coupled between the output shaft 26 and the transmission 50. The clutch mechanism 62 allows a user to limit torque output of the ratchet tool 10 to a desired setting. This would aid the user in assembling delicate joint screws, or screws with a specified torque rating. In the illustrated embodiment, the clutch mechanism 62 includes an adjustment collar 66 to facilitate adjustment of the clutch mechanism 62 to different torque settings.

Figure 3:
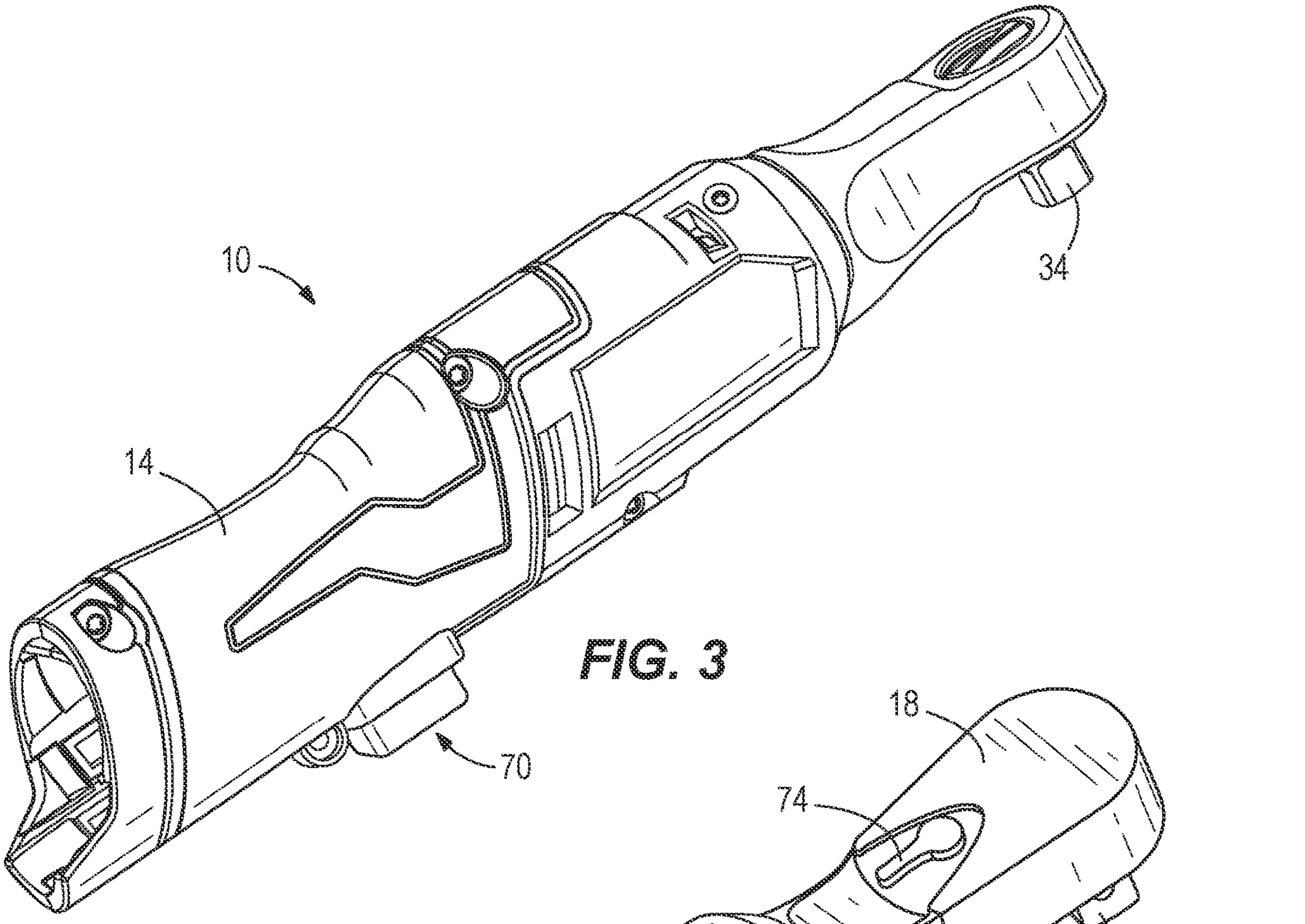
FIG. 3 is a perspective view of the powered ratchet tool of FIG. 1 illustrating an actuator.

With reference to FIG. 3, the ratchet tool 10 includes an actuator 70 for controlling operation of the ratchet tool 10 (e.g., to energize/de-energize the motor 22). In the illustrated embodiment, the actuator 70 is a push-button that can be depressed into the housing 14 to energize the motor 22. The illustrated actuator 70 extends from the housing 14 in the same direction as the output drive 34.

Figure 4:
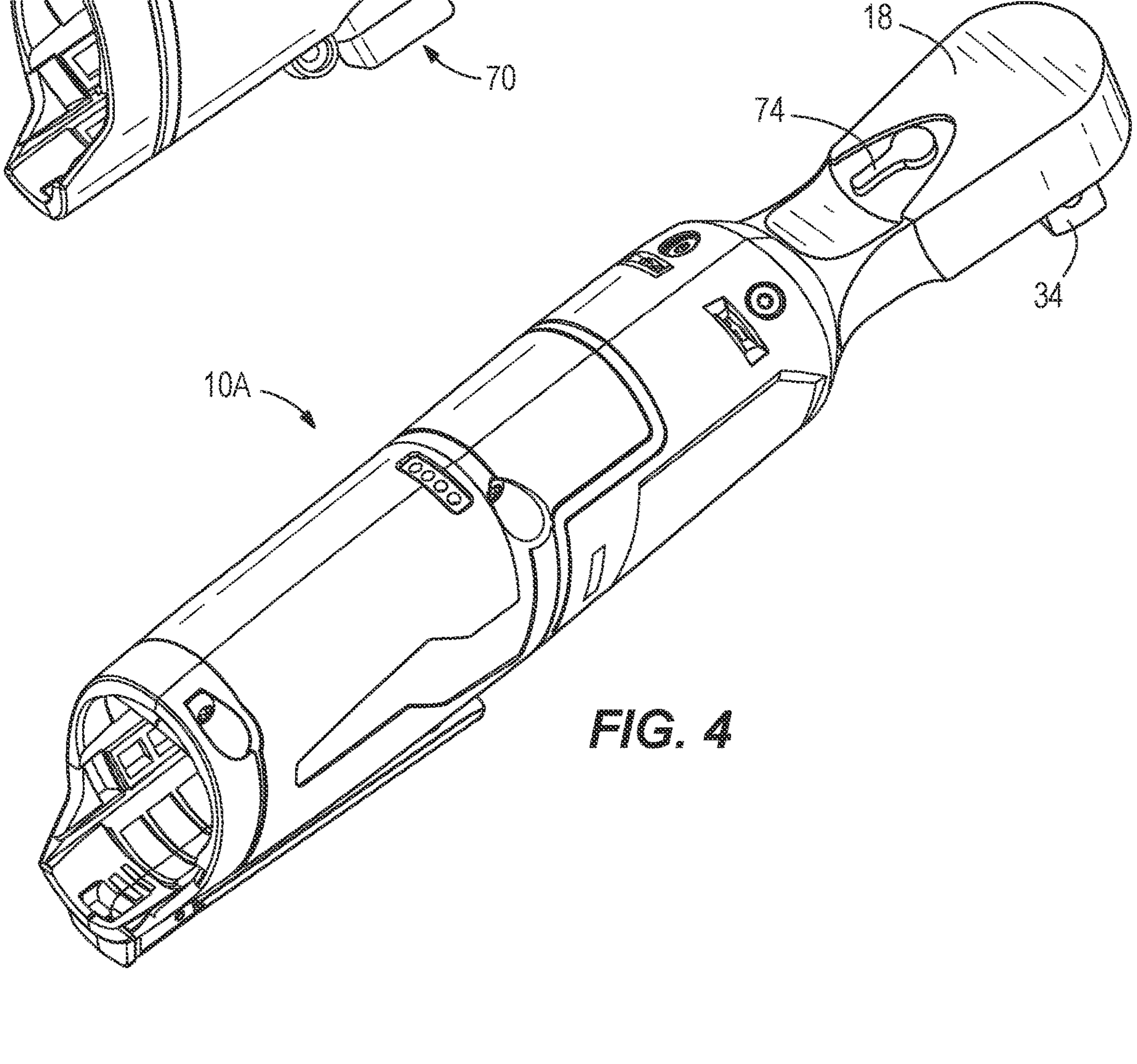
FIG. 4 is a perspective view of a powered ratchet tool according to a second embodiment.

FIG. 4 illustrates a powered ratchet tool 10A according to another embodiment. The ratchet tool 10A is similar to the ratchet tool 10 described above with reference to FIGS. 1-3. As such, the following description focuses on differences between the ratchet tool 10A and the ratchet tool 10, and features of the ratchet tool 10A corresponding with features of the ratchet tool 10 are given identical reference numbers. Finally, it should be understood that features of the ratchet tool 10A may be incorporated into the ratchet tool 10 and vice versa.

The illustrated ratchet tool 10A includes a sealed head 18. The sealed head 18 encloses a ratchet mechanism coupled to the output drive 34. The sealed head 18 may retain lubricant (e.g., grease) for the ratchet mechanism and also prevent dirt or other contaminants from entering the ratchet mechanism. The sealed head 18 includes a reversing lever 74 for reversing an operating direction of the ratchet mechanism. The reversing lever 74 is offset from the output drive 34 and on an opposite side of the head 18 from the output drive 34.

Figure 5:
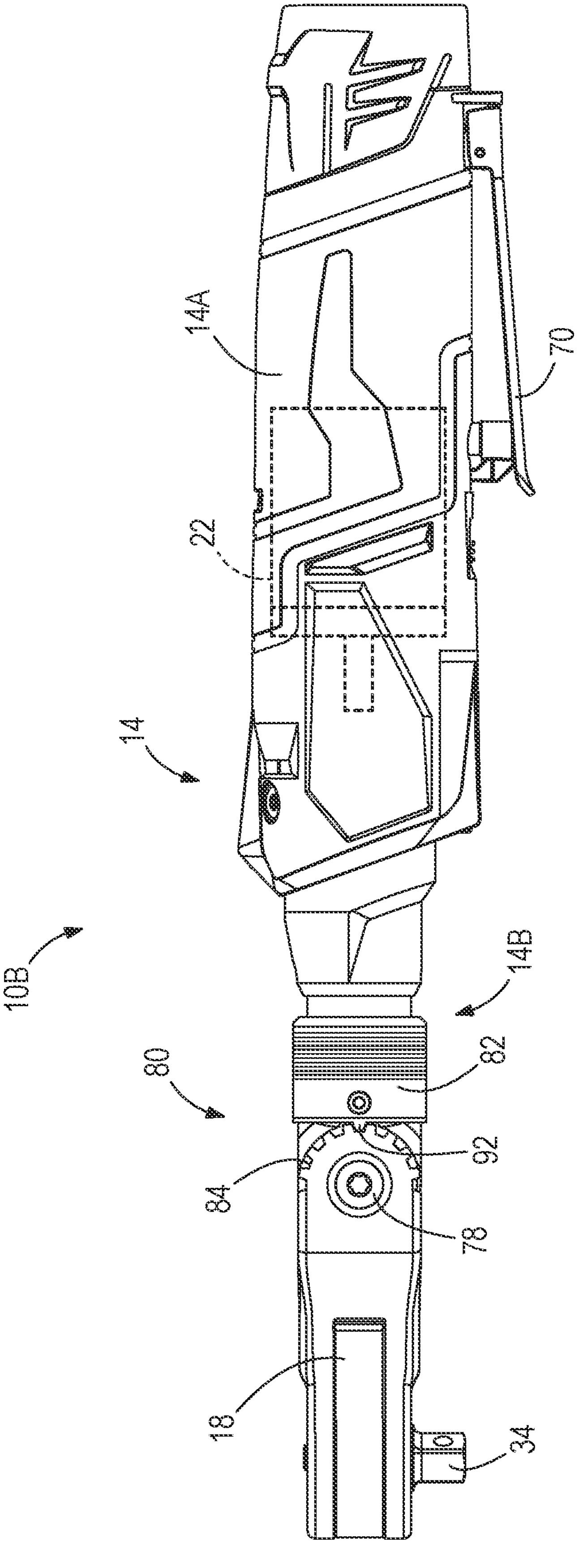
FIG. 5 is a side view of a powered ratchet tool according to a third embodiment.

FIG. 5 illustrates a powered ratchet tool 10B according to another embodiment. The ratchet tool 10B is similar to the ratchet tool 10 described above with reference to FIGS. 1-3. As such, the following description focuses on differences between the ratchet tool 10B and the ratchet tool 10, and features of the ratchet tool 10B corresponding with features of the ratchet tool 10 are given identical reference numbers. Finally, it should be understood that features of the ratchet tool 10B may be incorporated into the ratchet tool 10 or the ratchet tool 10A and vice versa.

The illustrated ratchet tool 10B includes a pivotable head 18. The pivotable head 18 encloses a ratchet mechanism 31 (FIG. 6) coupled to an output drive 34. The ratchet tool 10B includes a housing 14 that includes a motor housing portion 14A and a gear housing portion 14B. The ratchet tool 10B includes a motor 22 disposed within the motor housing 14A and an actuator 70 for controlling operation of the ratchet tool 10 (e.g., to energize/de-energize the motor 22).

With continued reference to FIG. 5, the pivotable head 18 is pivotally coupled to the gear housing portion 14B via two screws or pins 78 that extend through opposing sides of the pivotable head 18 and the gear housing portion 14B. The pivotable head 18, is pivotable with respect to the housing 14 between a plurality of discrete orientations (see e.g., FIGS. 8A-8D), as described in greater detail below. The ratchet tool 10B further includes a locking mechanism 80 including engaging portions 84 of the pivotable head 18 and a collar 82 slidably disposed around the gear housing portion 14B. The locking mechanism 80 is operable to lock the pivotable head 18 into each of the plurality of discrete orientations, as will be described in more detail below.

Figure 6:
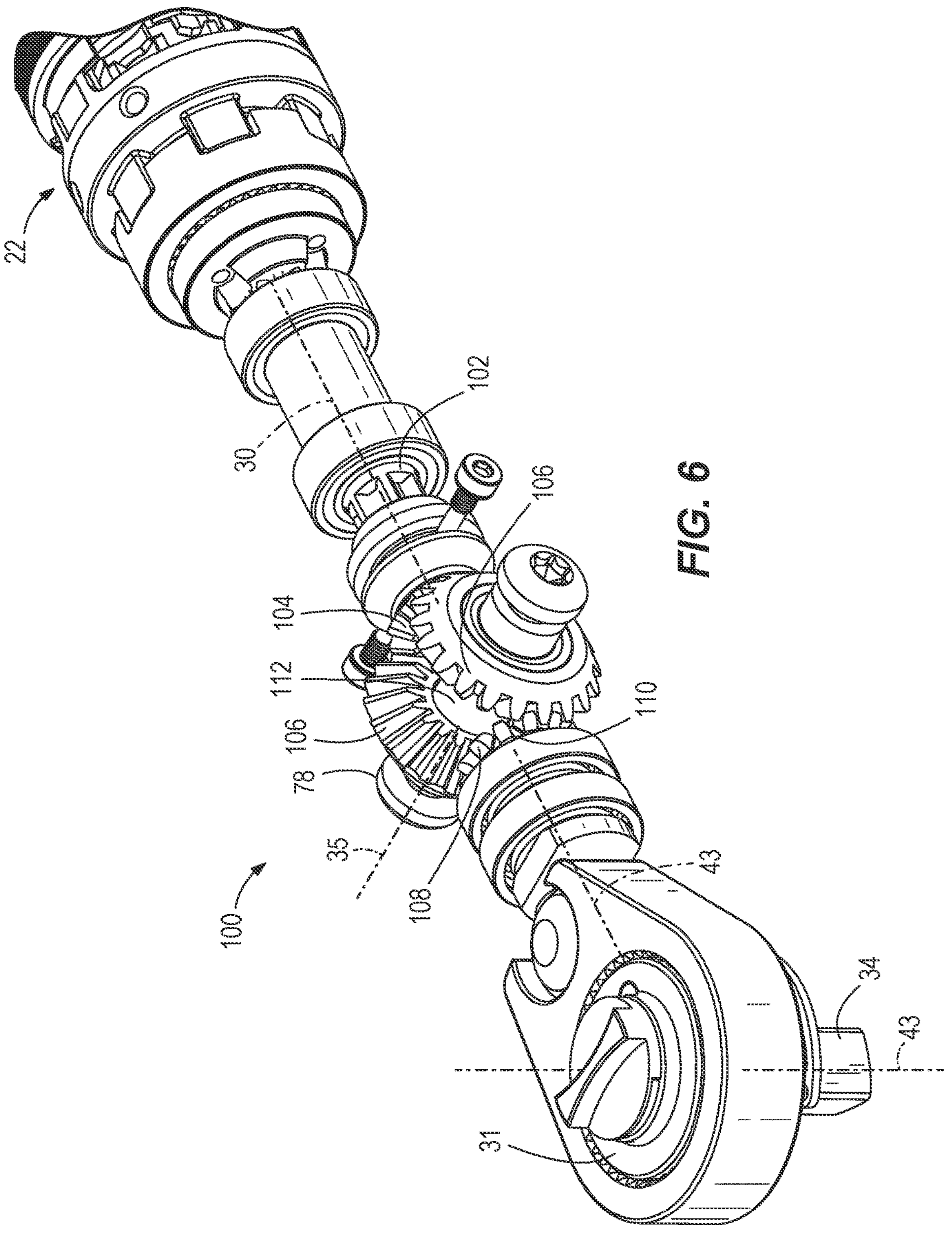
FIG. 6 is a perspective view of a gear assembly of the powered ratchet tool of FIG. 5.

FIG. 6 illustrates a gear assembly 100 of the ratchet tool 10B. The gear assembly 100 includes an input shaft 102, an input bevel gear 104 rotatably coupled to the input shaft 102 for corotation therewith, two idler bevel gears 106, an output bevel gear 108, and an output shaft 110 coupled to the output bevel gear 108 for corotation therewith. The input shaft 102 is coupled to an output spindle of the motor 22 for corotation therewith about a first axis 30. The idler bevel gears 106 engage the input bevel gear 104 and rotate about a second axis 35 perpendicular to the first axis 30. The idler bevel gears 106 rotate about an pivot idler shaft 112, through which the screws 78 extend along the second axis 35. The output bevel gear 108 engages the idler bevel gears 106 such that the output shaft 110 rotates about a third axis 43 in response to rotation of the input shaft 102 about the first axis 30. In the position illustrated in FIG. 6, the third axis 43 is coaxial with the first axis 30. However, pivoting the pivotable head 18 about the second axis 35 will vary the orientation of the third axis 43 relative to the first axis 30. For example, the head 18 may be pivoted to positions in which the third axis 43 is obliquely oriented relative to the first axis 30, and one or more positions in which the third axis 43 is perpendicular to the first axis 30.

The gear assembly 100 may be configured such that the output shaft 110 rotates at a rotational speed that is different from a rotational speed of the input shaft 102. For example, the input bevel gear 104, idler bevel gears 106, and output bevel gear 108 may be sized to provide a torque increase and speed reduction from the input shaft 102 to the output shaft 110. In other embodiments, the output shaft 110 may rotate at the same rotational speed as the input shaft 102, and a second gear assembly (e.g., a planetary gear assembly or the like) may optionally be provided between the input shaft 102 and the output spindle of the motor 22.

The pivotable head 18 is pivotable about the second axis 35, such that the output bevel gear 108 engages the idler bevel gears 106 in each of the plurality of discrete orientations to establish a driving connection. The output shaft 110 is configured to drive the ratchet mechanism 31 of the ratchet tool 10B, and thereby rotate the output drive 34 about a fourth axis or output drive axis 45, which in the illustrated embodiment is perpendicular to the third axis 43.

In some embodiments, the pivotable head 18 may be rotated such that the third axis 43 is perpendicular to the first axis 30 in two different orientations without disassembling the structural elements of the pivotable head 18 during operation. As such, a first position and a second position of the pivotable head 18 may be offset by 180 degrees. This large range of available orientations allows the ratchet tool 10B to perform fastening tasks in tight or irregular spaces not accessible to typical powered ratchets. In other embodiments, the pivot range of the pivotable head 18 may exceed or be less than 180 degrees.

Figure 7A:
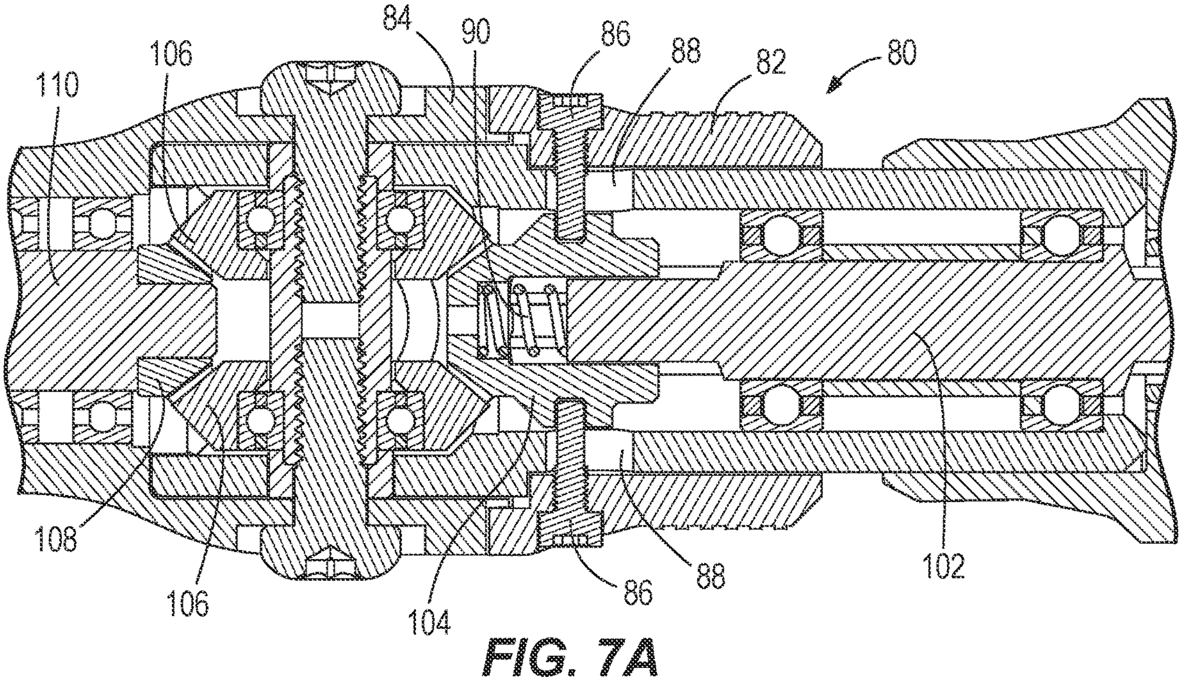
FIGS. 7A and 7B are cross-sectional views illustrating a locking mechanism of the powered ratchet tool of FIG. 5.
Figure 7B:
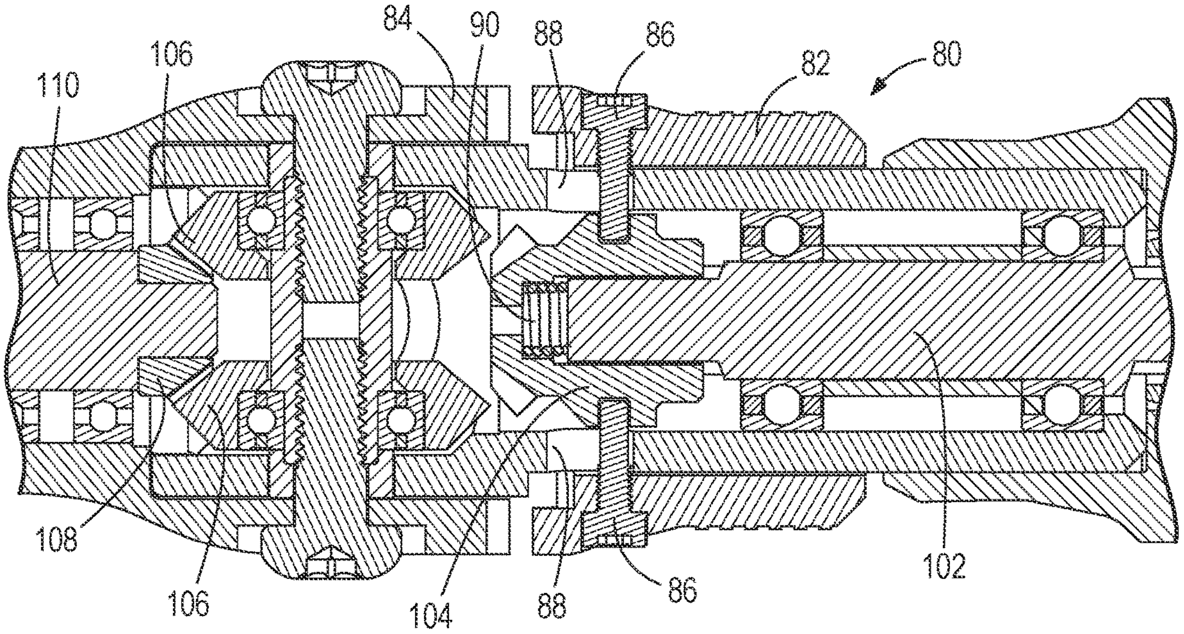

FIGS. 7A and 7B illustrate the locking mechanism 80 of the ratchet tool 10B. The collar 82 is disposed around the gear housing portion 14B and coupled to the input bevel gear 104 via fasteners 86 that extend through slots 88 of the gear housing portion 14B. The input bevel gear 104 is slidable on the input shaft 102 along the first axis 30 between a first position (FIG. 7A), in which the input bevel gear 104 engages the idler bevel gears 106, and a second position (FIG. 7B), in which the input bevel gear 104 does not engage the idler bevel gears 106. A biasing mechanism 90 is provided between the input bevel gear 104 and the input shaft 102 in a bore 103 (FIG. 7A) of the input bevel gear 104. The biasing mechanism 90, which is a spring in the illustrated embodiment, biases the input bevel gear 104 into the first position. The slots 88 in the gear housing portion 14B are larger than a diameter of the fasteners 86 such that the collar 82 can slide with the input bevel gear 104 between the first and second position. Accordingly, the collar 82 can be slid by a user of the ratchet tool 10B to move the input bevel gear 104 out of engagement with the idler bevel gears 106, facilitating adjustment of the pivotable head 18 relative to the motor housing portion 14A.

Figure 8A:
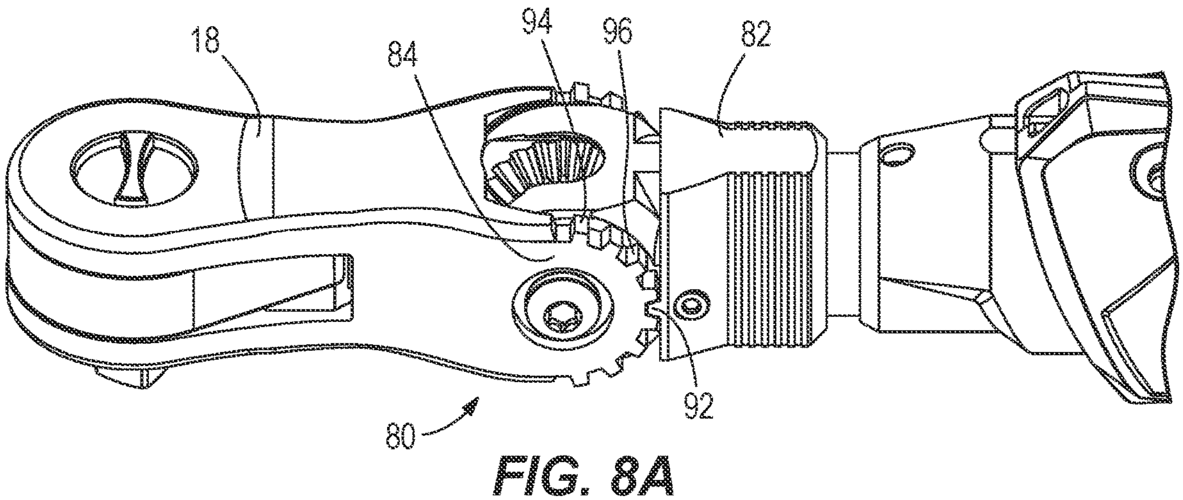
FIGS. 8A-8D are perspective views illustrating operation of the locking mechanism of FIGS. 7A and 7B.
Figure 8B:
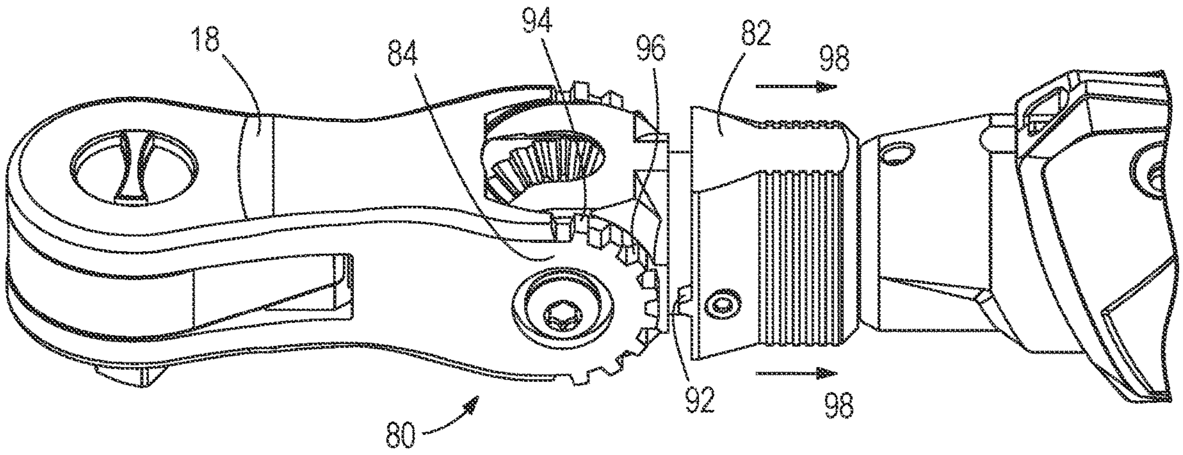
Figure 8C:
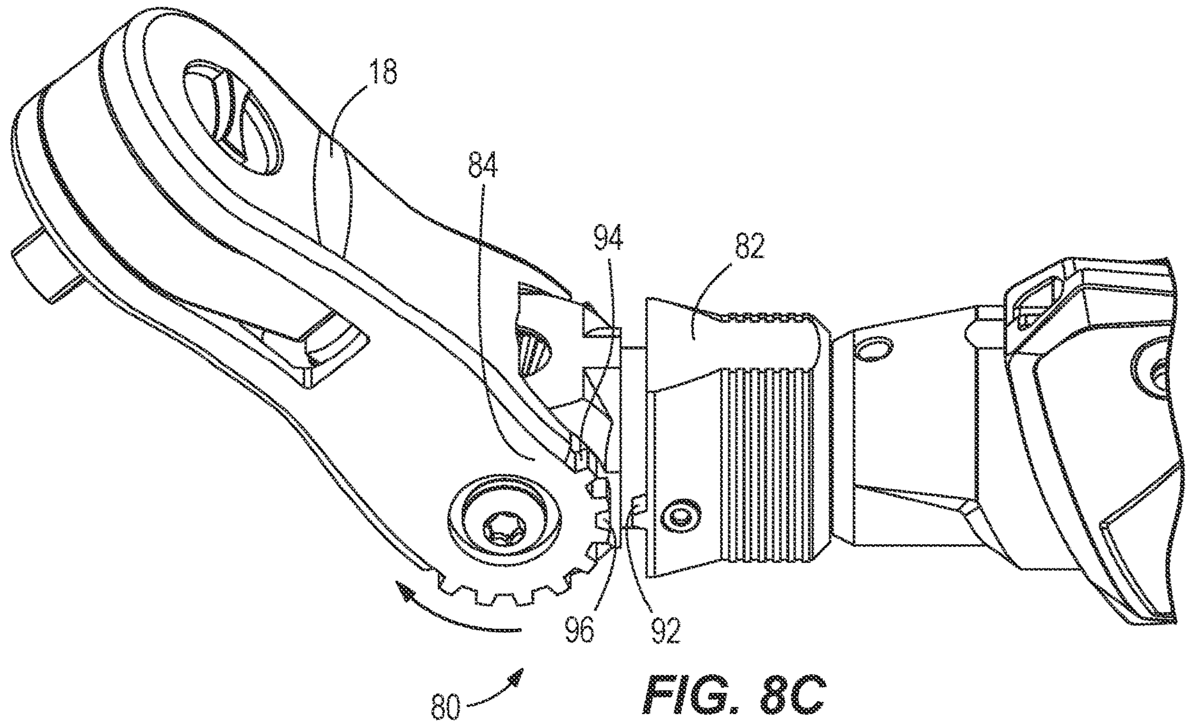
Figure 8D:
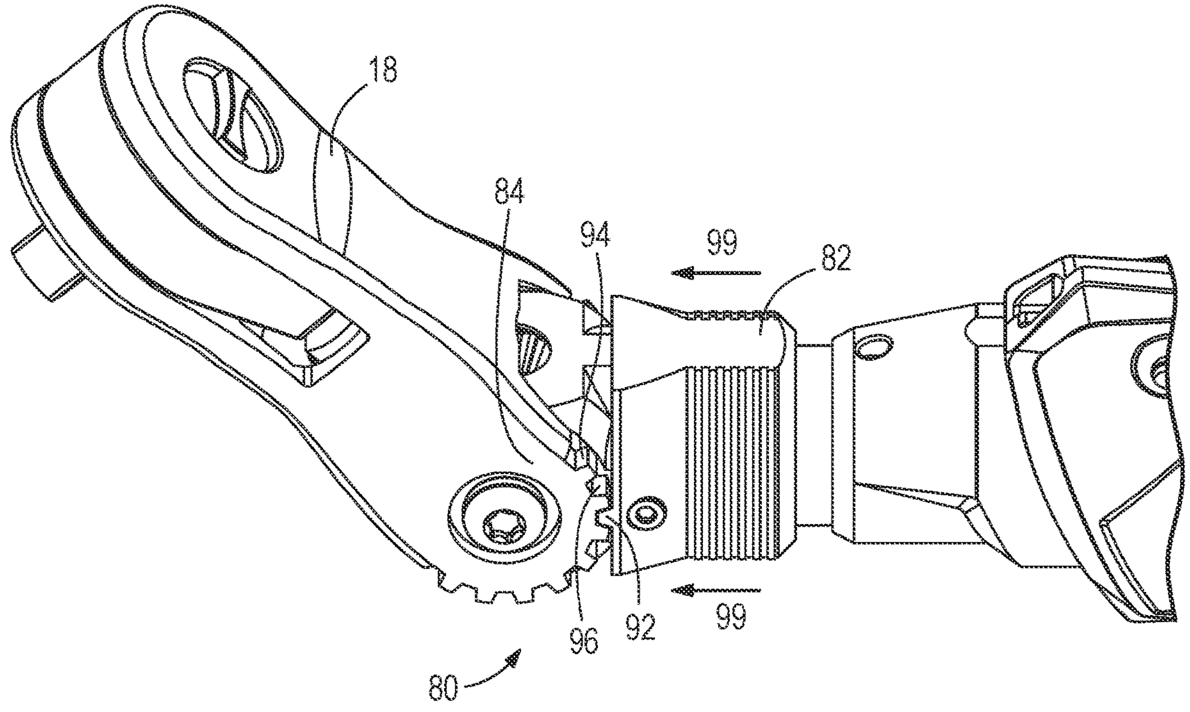

FIGS. 8A-8D further illustrate the locking mechanism 80 of the ratchet tool 10. The collar 82 includes two protrusions 92 that extend from an end of the collar 82 toward the engaging portions 84 of the pivotable head 18. The engaging portions 84 of the pivotable head 18 include a plurality of teeth 94 and a plurality of grooves 96 between each of the plurality of teeth 94. Each protrusion 92 of the collar 82 is configured to engage one of the plurality of grooves 96 when the collar 82 is in the first position (FIG. 8A). When the protrusion 92 is engaged with one of the plurality of grooves 96, the pivotable head 18 is locked in one of the plurality of discrete orientations such that it cannot be pivoted with respect to the housing 14. To allow pivoting of the pivotable head 18, the collar 82 must be moved into the second position, in a direction illustrated by arrows 98 (FIG. 8B), against the biasing force of the biasing mechanism 90. When the collar 82 is in the second position, the protrusion 92 is moved out of engagement with the one of the plurality of grooves 96, and the pivotable head 18 can be pivoted into another of the plurality of discrete orientations (FIG. 8C). The collar 82 can then be released, in a direction illustrated by arrows 99, such that the protrusion 92 engages another of the plurality of grooves 96, and the pivotable head 18 cannot be pivoted with respect to the housing 14 (FIG. 8D).

FIGS. 9A-9E illustrate a powered ratchet tool 10C according to another embodiment. The ratchet tool 10C is similar to the ratchet tool 10 described above with reference to FIGS. 1-3. As such, the following description focuses on differences between the ratchet tool 10C and the ratchet tool 10, and features of the ratchet tool 10C corresponding with features of the ratchet tool 10 are given identical reference numbers. Finally, it should be understood that features of the ratchet tool 10C may be incorporated into the ratchet tool 10, the ratchet tool 10A, or the ratchet tool 10B, and vice versa.

Figure 9A:
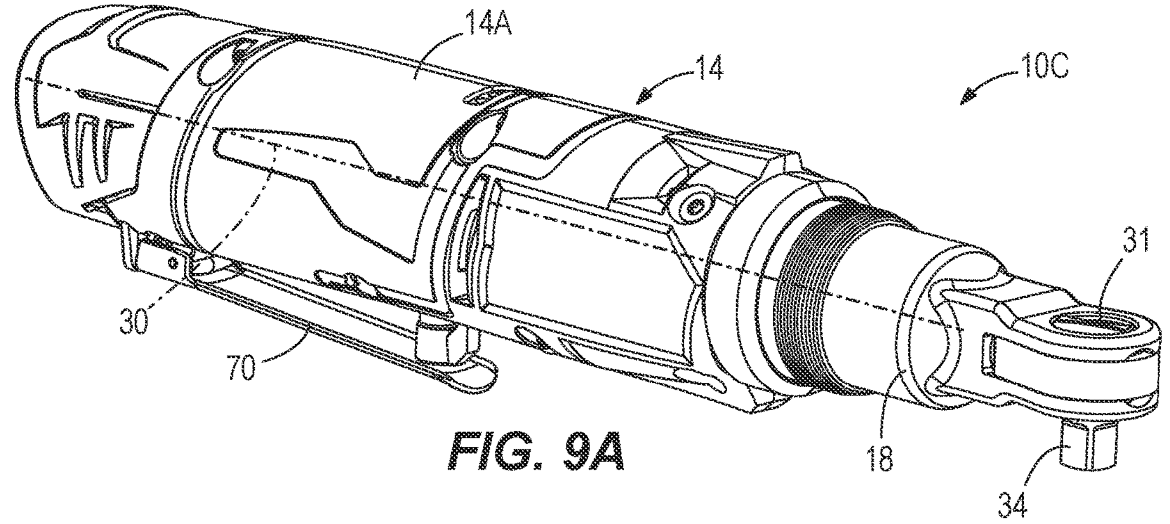
FIGS. 9A-9C are perspective views of a powered ratchet tool according to a fourth embodiment.
Figure 9B:
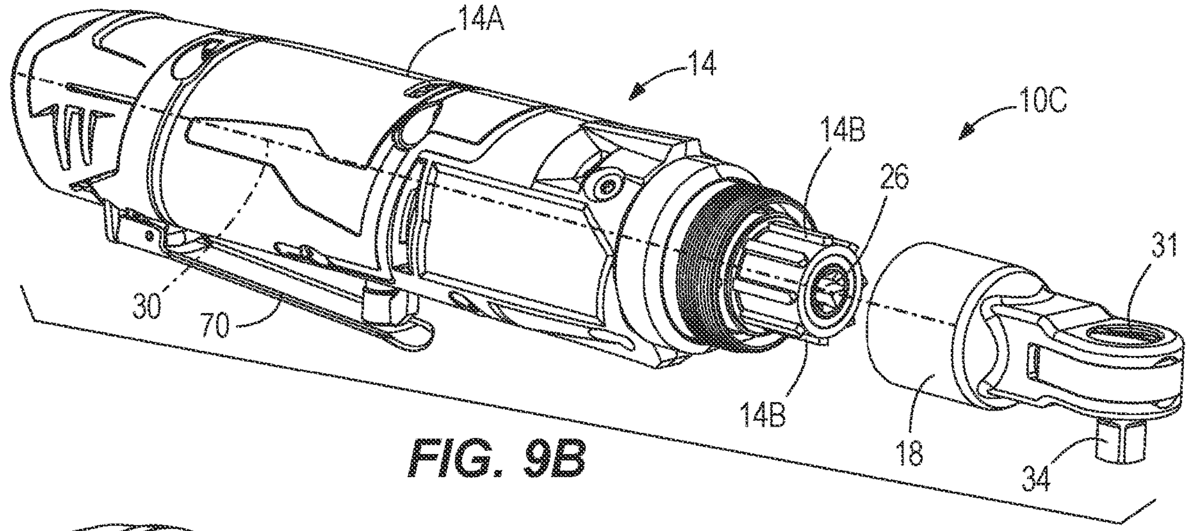
Figure 9C:
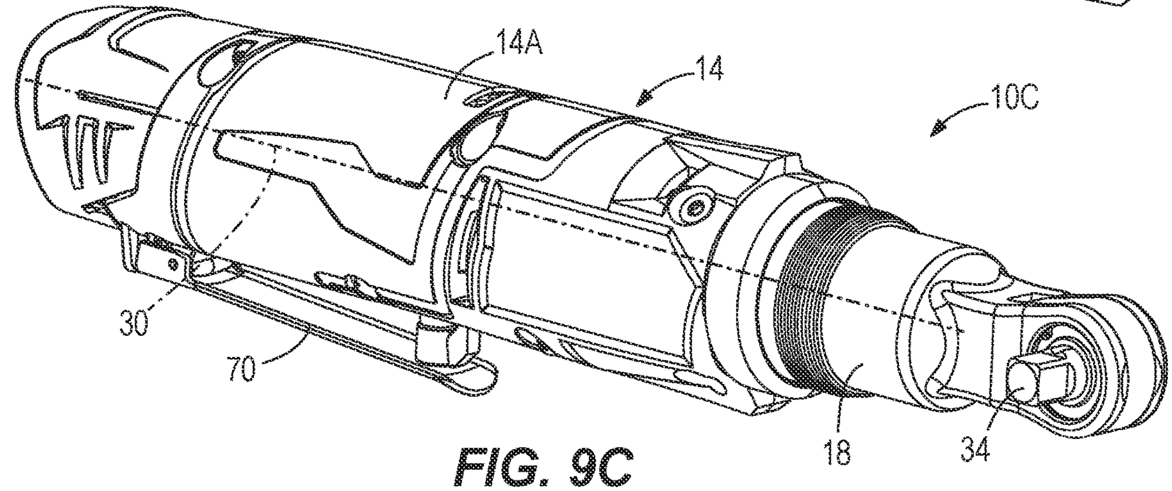
Figure 9D:
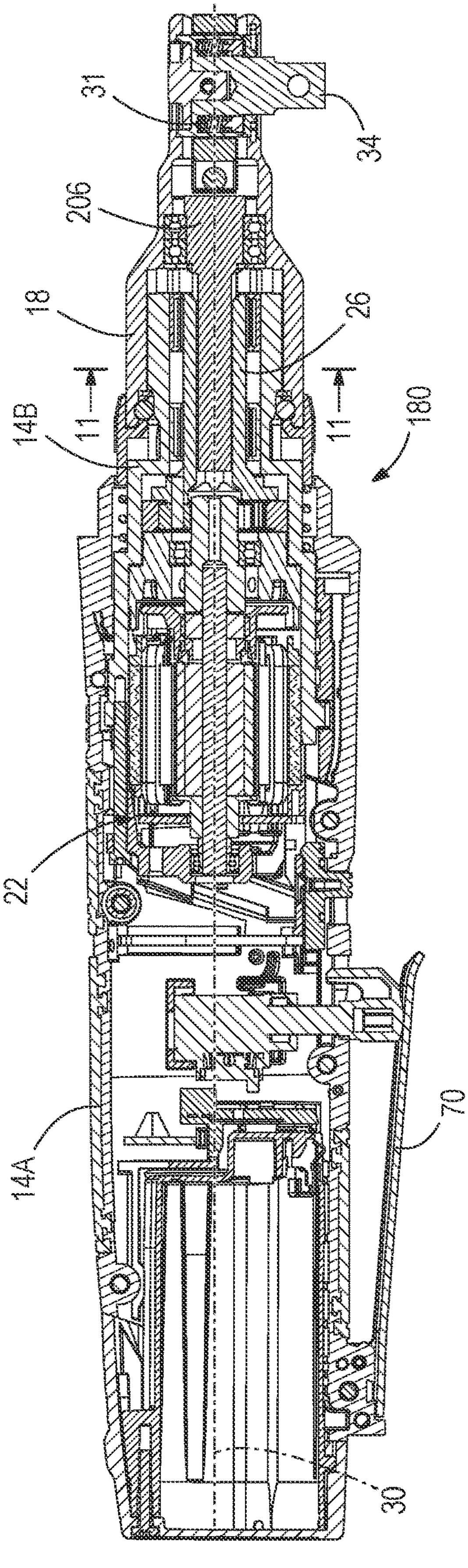
FIG. 9D is a cross-sectional view of the powered ratchet tool of FIGS. 9A-9C.

The illustrated ratchet tool 10C includes a removable head 18. The removable head 18 encloses a ratchet mechanism 31 coupled to an output drive 34. The ratchet tool 10D further includes a motor 22 configured to drive the ratchet mechanism 31 and an actuator 70 for controlling operation of the ratchet tool 10 (e.g., to energize/de-energize the motor 22). The ratchet tool 10C includes a housing 14 that includes a main housing portion 14A and a gear housing portion 14B that extends from the main housing portion 14A along a first axis 30. The removable head 18 is removably coupled to the housing 14 and at least partially surrounds the gear housing portion 14B when the removable head 18 is coupled to the housing 14 (FIG. 9A). The removable head 18 may be detached from the housing 14 (FIG. 9B), rotated about the first axis 30 to a different orientation, and reattached to the housing 14 (FIG. 9C). The ratchet tool 10C includes a coupling mechanism 180 (FIG. 9D) for securing the removable head 18 to the housing 14, as is described in more detail below.

Figure 9E:
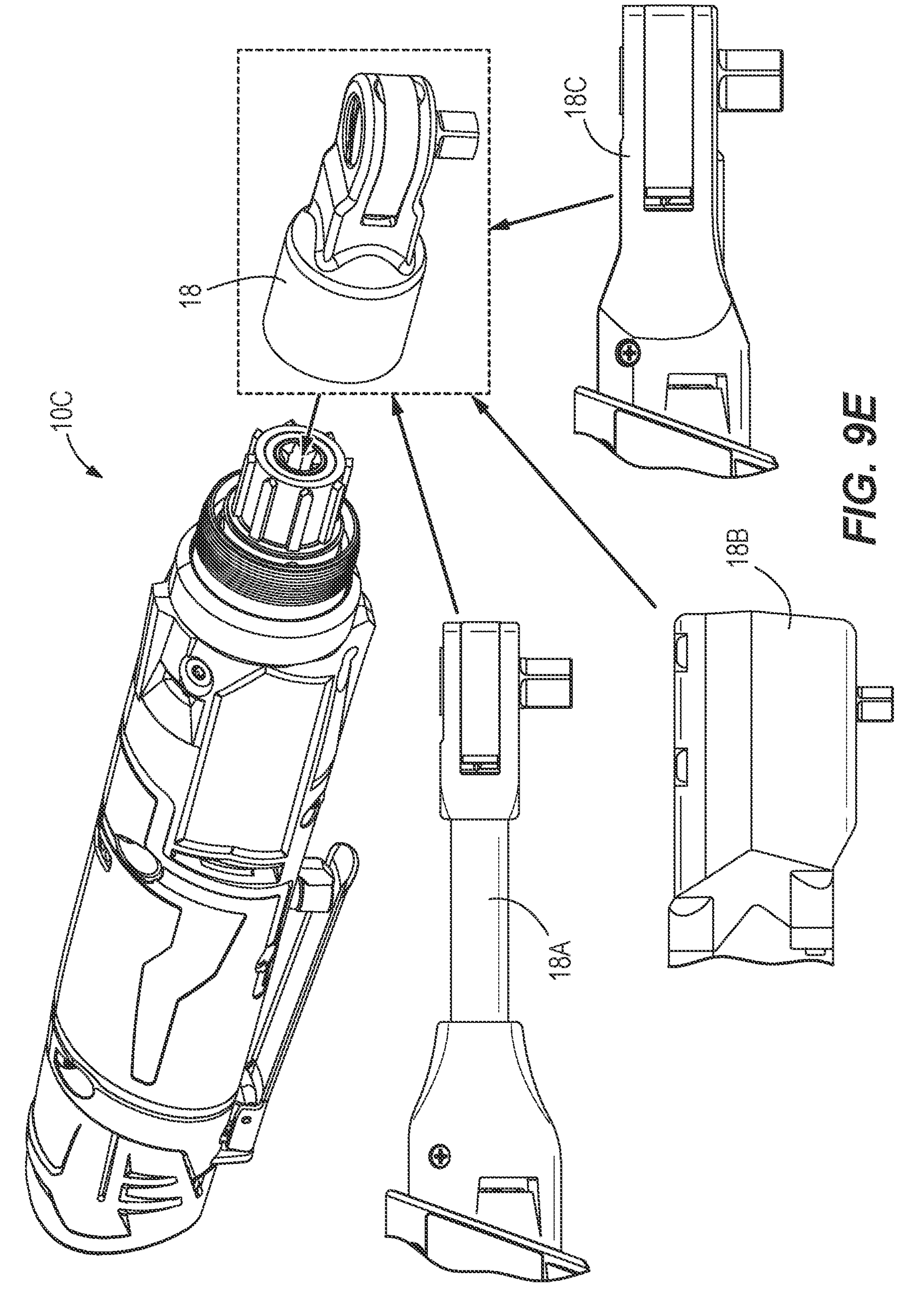
FIG. 9E illustrates a plurality of exemplary interchangeable heads which may be used with the powered ratchet tool of FIGS. 9A-9C.

As shown in FIG. 9E, in some embodiments, the ratchet tool 10C may be compatible with a plurality of removeable and interchangeable heads. The illustrated embodiment includes a first removable head 18, a second removable head 18A, a third removable head 18B, and a fourth removable head 18C. The plurality of removeable heads may further utilize, for example, the following fastening mechanisms: a high speed ratchet, an extended reach ratchet, a right angle impact driver, a ratchet including a clutch for a more controlled torque application, and a straight drive ratcheting nut driver.

FIGS. 10A-10D illustrate the coupling mechanism 180 of the ratchet tool 10C. The coupling mechanism 180 includes a sleeve 182 disposed around the gear housing portion 14B and moveable along the first axis 30 between a first position (FIG. 10A) and a second position (FIG. 10B) and a plurality of detent balls 184 (e.g., two detent balls 184). The detent balls 184 are coupled to the sleeve 182 via arms 186 (e.g., the arms 186 include apertures that receive the detent balls 184), such that the detent balls 184 are moveable with the sleeve 182 in a direction parallel to the first axis 30 and movable relative to the sleeve 182 in a direction substantially perpendicular to the first axis 30.

A channel 188 circumferentially surrounds an exterior surface of the gear housing portion 14B, and the channel 188 includes a narrow portion 188A and a wide portion 188B. The plurality of detent balls 184 are disposed in the channel 188 such that the detent balls 184 move from the narrow portion 188A to the wide portion 188B when the sleeve 182 moves from the first position to the second position. A space 194 between the detent balls 184 and the sleeve 182 is greater when the detent balls 184 are in the wide portion 188B of the channel 188 than when the detent balls 184 are in the narrow portion 188A. That is, the detent balls 184 are pushed further into the space 194 when the sleeve 182 is in the first position, and the detent balls 184 are able to at least partially withdraw from the space 194 when the sleeve 182 is in the second position. A biasing mechanism 190 (i.e., a spring in the illustrated embodiment) biases the sleeve 182 toward the first position. The biasing mechanism 190 is disposed in a gap 192 between the main housing portion 14A and the gear housing portion 14B.

Figure 10A:
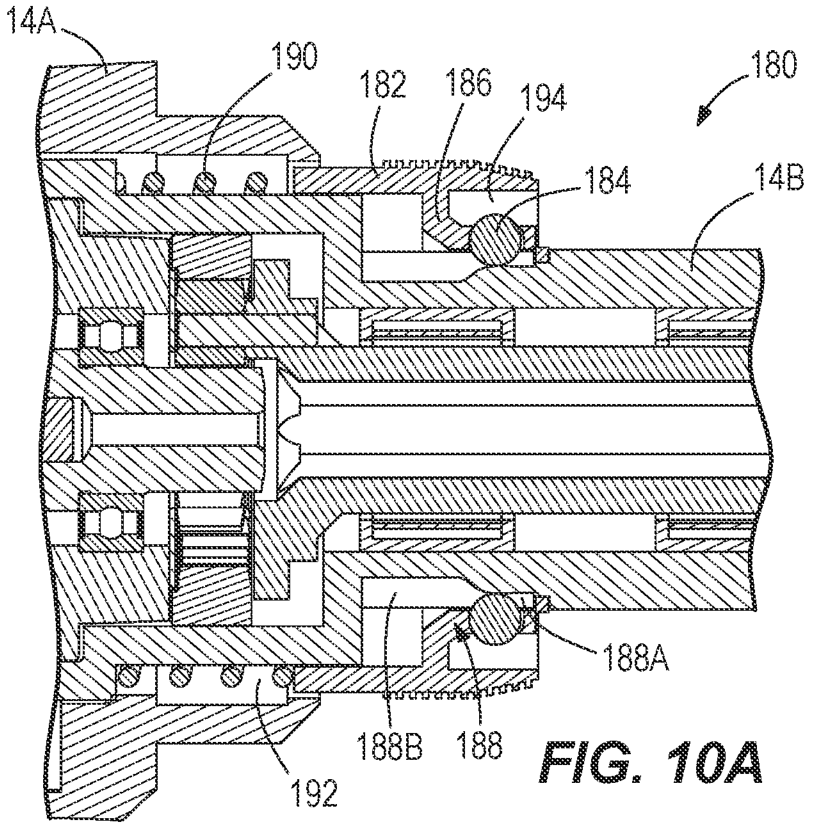
FIGS. 10A-10D are cross-sectional views illustrating operation of a coupling mechanism of the powered ratchet tool of FIGS. 9A-9C.
Figure 10B:
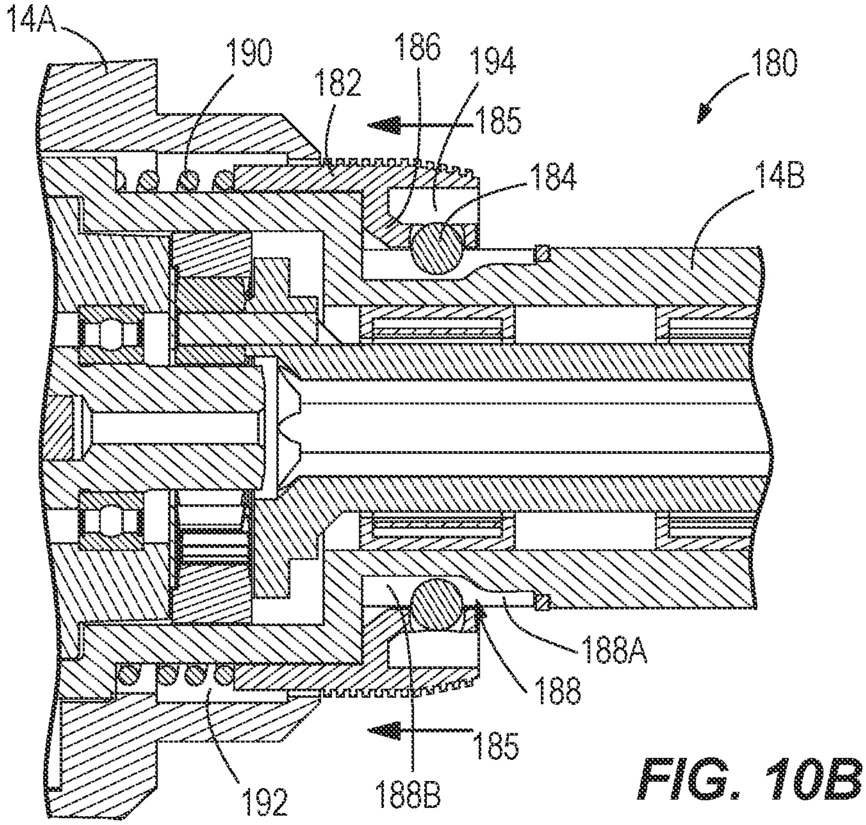
Figure 10C:
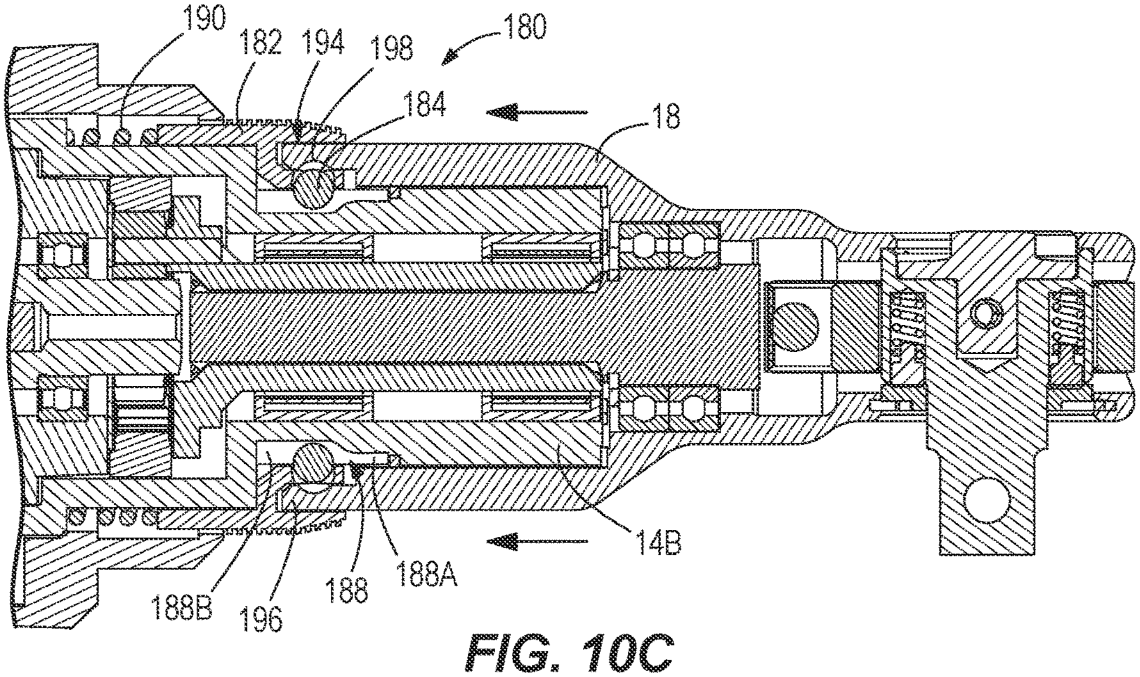
Figure 10D:
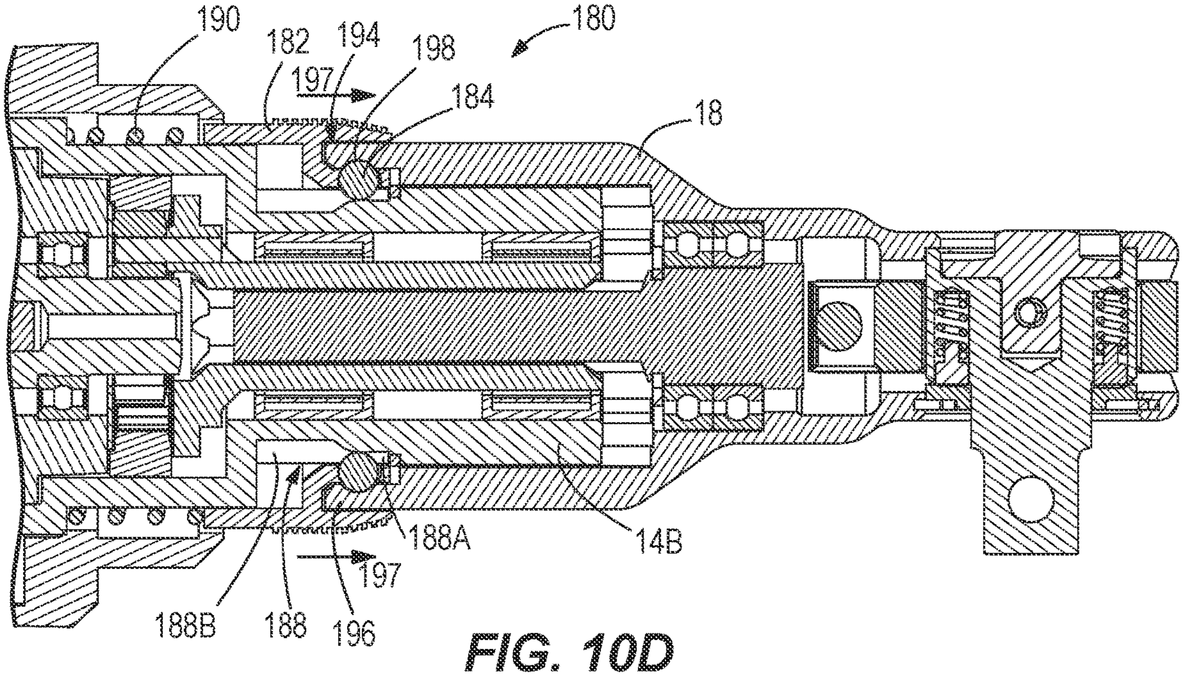

FIG. 10A illustrates the ratchet tool 10C without the removable head 18. To attach the removable head 18 to the ratchet tool 10C, a user must move the sleeve 182, in a direction illustrated by arrows 193, against the biasing force of the biasing mechanism 190, into the second position (FIG. 10B). With the detent balls 184 in the wide portion 188B of the channel 188, the space 194 between the detent balls 184 and the sleeve 182 is large enough to receive a bottom rim 196 of the removable head 18 (FIG. 10C). A slot or groove 198 circumferentially surrounds an inner surface of the removable head 18 and is sized to receive the detent balls 184 when the removable head 18 is attached to the ratchet tool 10C. With the bottom rim 196 of the removable head 18 within the space 194, the user can release the sleeve 182, in a direction illustrated by arrows 197, to lock the removable head 18 in attachment with the ratchet tool 10C (FIG. 10D). When the sleeve 182 is released, the detent balls 184 move back into the narrow portion 188A of the channel 188 and are received and held within the slot 198 of the removable head 18. With the detent balls 184 in the narrow portion 188A of the channel 188, the space 194 is smaller than the bottom rim 196 of the removable head 18, so the removable head 18 cannot be removed from the ratchet tool 10C. Thus, the removable head 18 is locked to the ratchet tool 10C when the sleeve 182 is released to the first position.

Figure 11:
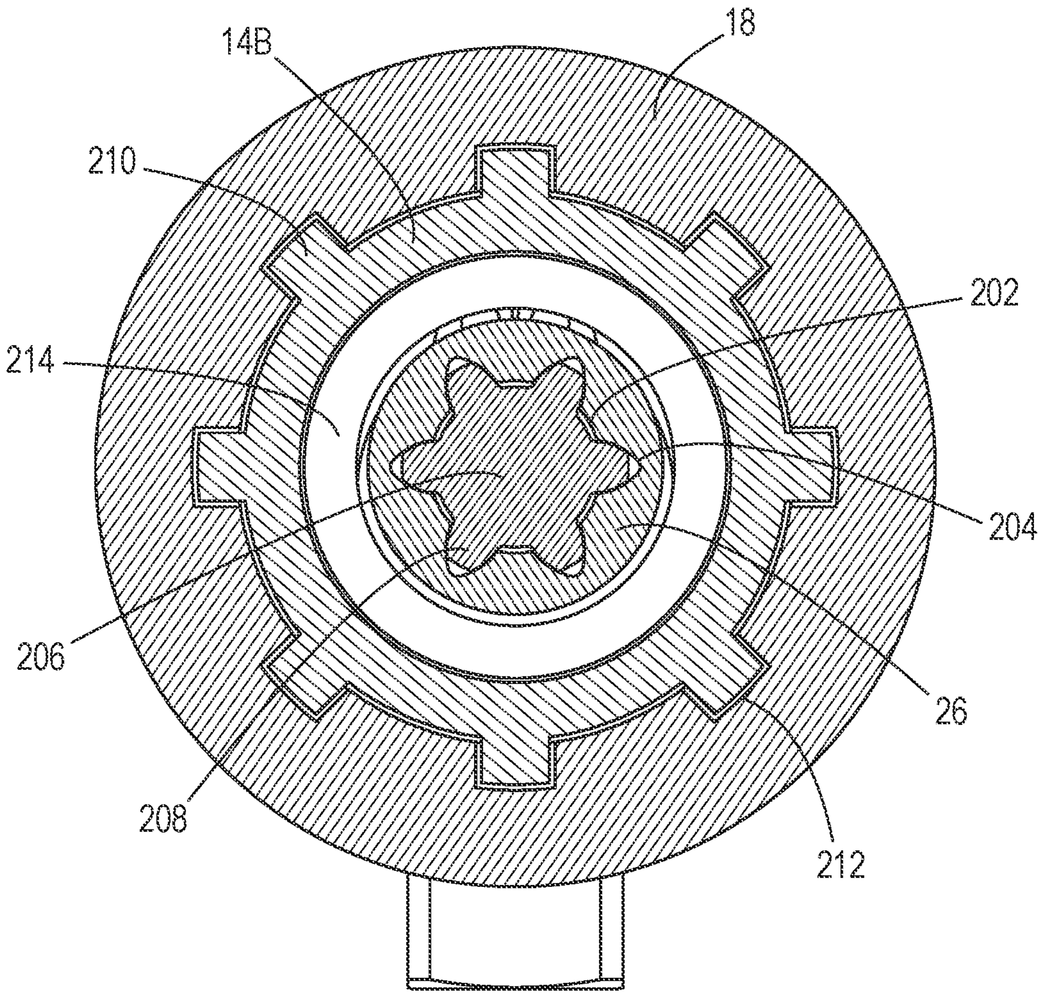
FIG. 11 is a cross-sectional view of a removable head coupled to the powered ratchet tool of FIGS. 9A-9C, taken along line 11-11 in FIG. 9D.

FIG. 11 illustrates a cross-sectional view of the ratchet tool 10C with the removable head 18 coupled to the ratchet tool 10C. The ratchet tool 10C includes an output shaft 26 driven by a motor 22 of the ratchet tool 10C (see FIG. 9D). The output shaft 26 extends through the gear housing 14B and includes a central bore 202 having engaging recesses 204. The removable head 18 includes a driven shaft 206 that is received within the bore 202 of the output shaft 26 when the removable head 18 is coupled to the ratchet tool 10C. The driven shaft 206 includes engaging protrusions 208 that engage the engaging recesses 204 of the output shaft 26, such that the driven shaft 206 is driven by the output shaft 26 in response to actuation of the motor 22. The gear housing portion 14B includes a plurality of alignment protrusions 210 that extend radially from the gear housing portion 14B. The removable head 18 includes a plurality of alignment recesses 212 that engage the plurality of alignment protrusions 210, when the removable head 18 is coupled to the ratchet tool 10C, such that the removable head 18 cannot rotate with respect to the gear housing portion 14B. Both the alignment protrusions 210 and the alignment recesses 212 are spaced apart symmetrically such that the removable head 18 may be attached to the gear housing portion 14B in a plurality of attachment orientations. The illustrated embodiment includes eight alignment protrusions and recesses 210, 212, corresponding to eight attachment orientations.

Figure 12A:
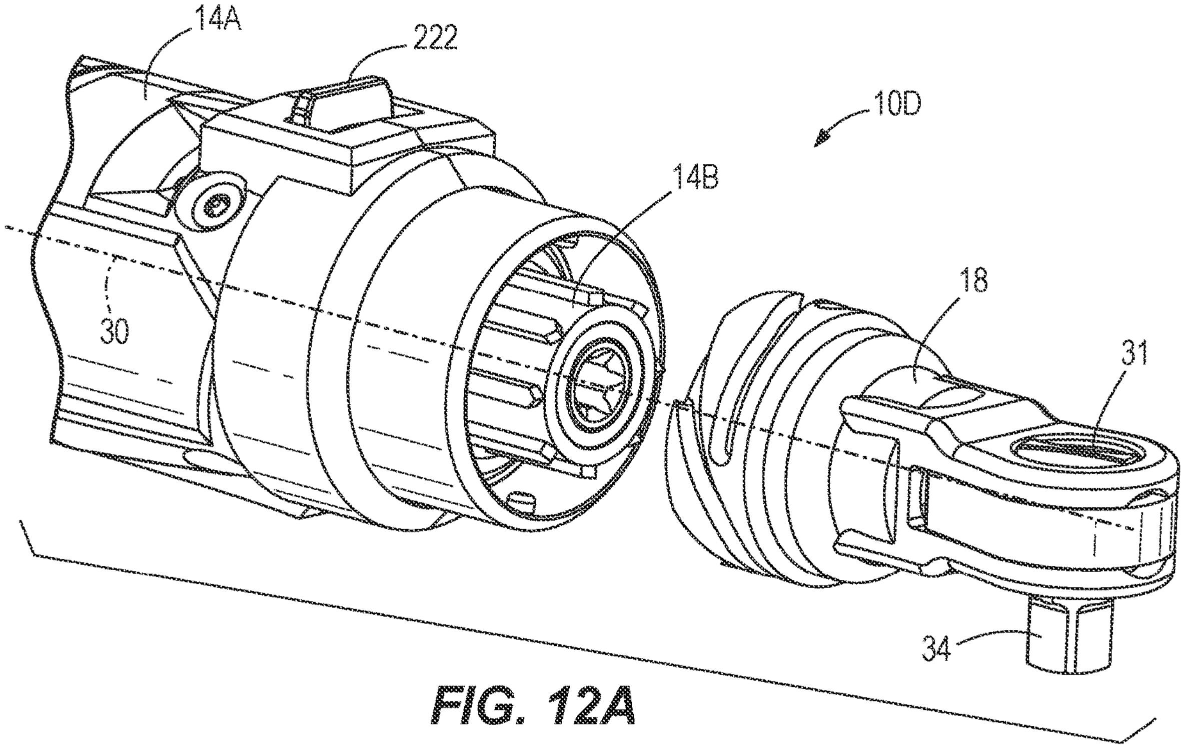
FIGS. 12A and 12B are perspective views of a powered ratchet tool according to a fifth embodiment.
Figure 12B:
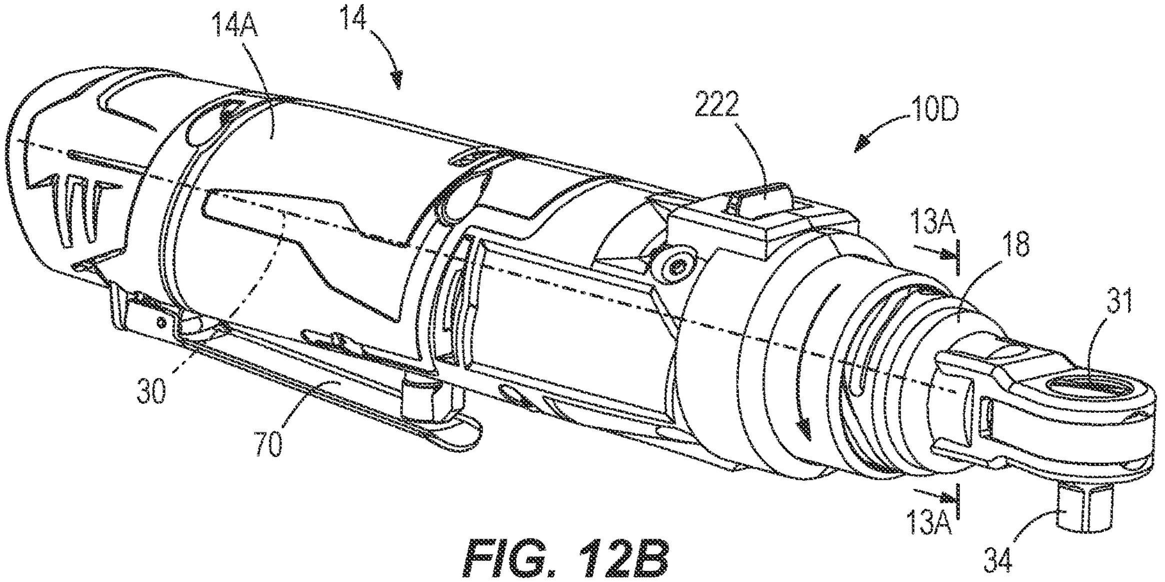

FIGS. 12A-12B illustrate a powered ratchet tool 10D according to another embodiment. The ratchet tool 10D is similar to the ratchet tool 10 described above with reference to FIGS. 1-3. As such, the following description focuses on differences between the ratchet tool 10D and the ratchet tool 10, and features of the ratchet tool 10D corresponding with features of the ratchet tool 10 are given identical reference numbers. Finally, it should be understood that features of the ratchet tool 10D may be incorporated into the ratchet tool 10, the ratchet tool 10A, the ratchet tool 10B, or the ratchet tool 10C, and vice versa.

The illustrated ratchet tool 10D includes a removable head 18. The removable head 18 encloses a ratchet mechanism 31 coupled to an output drive 34. The ratchet tool 10D further includes a motor 22 configured to drive the ratchet mechanism 31 and an actuator 70 for controlling operation of the ratchet tool 10 (e.g., to energize/de-energize the motor 22). The ratchet tool 10D includes a housing 14 that includes a main housing portion 14A and a gear housing portion 14B that extends from the main housing portion 14A along a first axis 30.

The removable head 18 is removably coupled to the housing 14 and at least partially surrounds the gear housing portion 14B when the removable head 18 is coupled to the housing 14. The removable head 18 may be detached from the housing 14, rotated about the first axis 30 to a different orientation, and reattached to the housing 14. The ratchet tool 10D includes a coupling mechanism 250 (FIGS. 16A-16B) for securing the removable head 18 to the housing 14, as is described in more detail below.

Figure 13A:
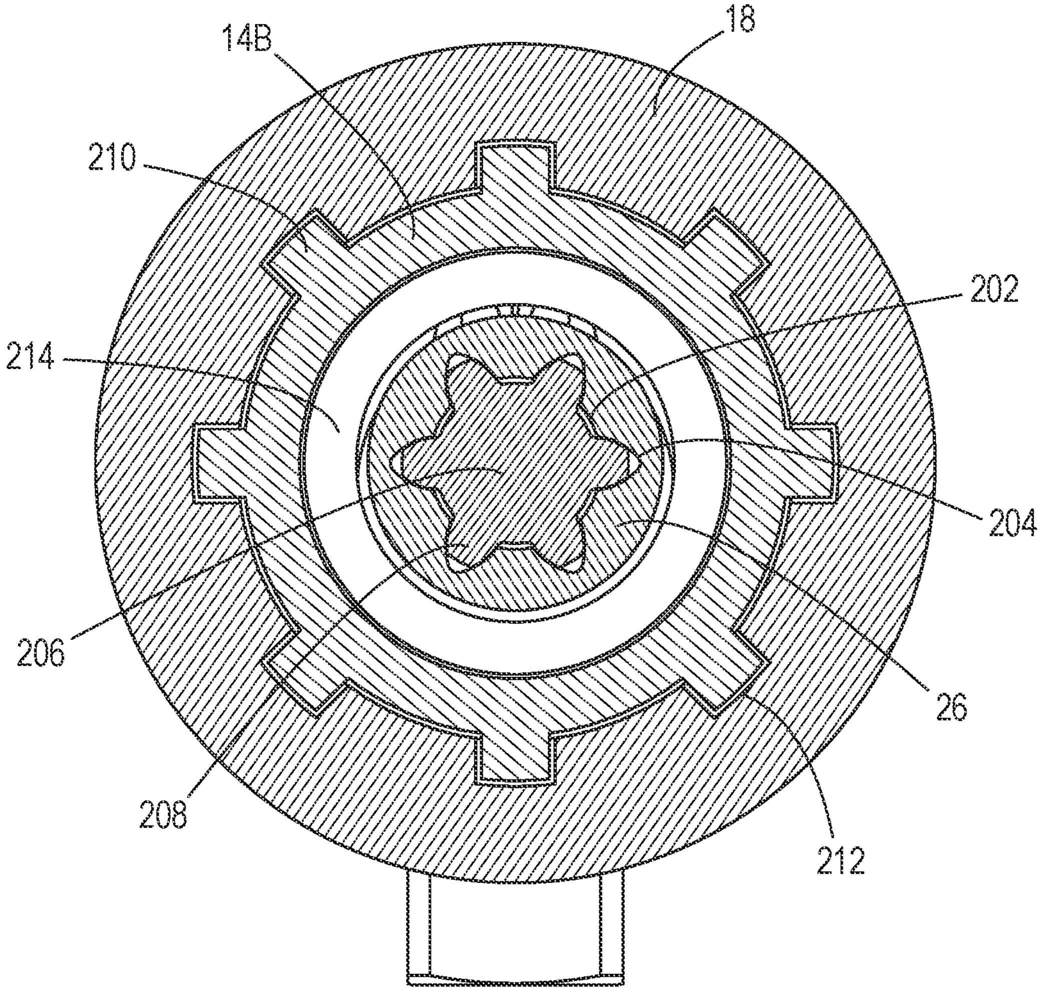
FIG. 13A is a cross-sectional view of a removable head coupled to the powered ratchet tool of FIGS. 12A-12B, taken along line 13A-13A in FIG. 12B.
Figure 13B:
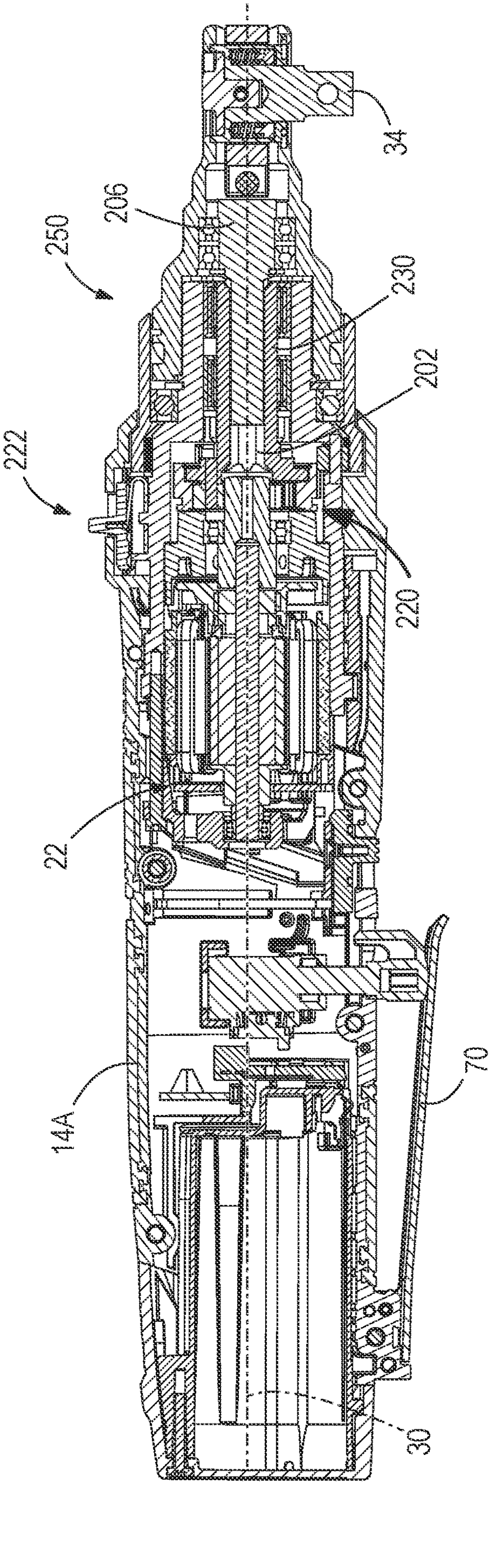
FIG. 13B is a cross-sectional view of the powered ratchet tool of FIGS. 12A-12B FIGS. 14A and 14B are cross-sectional views illustrating a planetary transmission and mode change mechanism of the powered ratchet tool of FIGS. 12A-12B in first and second positions.

FIGS. 13A-13B are cross-sectional views of the ratchet tool 10D with the removable head 18 coupled to the ratchet tool 10D. The ratchet tool 10D includes an output shaft 230 driven by the motor 22 of the ratchet tool 10C. The output shaft 230 extends through the gear housing 14B and includes a central bore 202 having engaging recesses 204 (FIG. 13A). The removable head 18 includes a driven shaft 206 that is received within the bore 202 of the output shaft 230 when the removable head 18 is coupled to the ratchet tool 10D. The driven shaft 206 includes engaging protrusions 208 that engage the engaging recesses 204 of the output shaft 230, such that the driven shaft 206 is driven by the output shaft 230 in response to actuation of the motor 22.

With reference to FIG. 13A, the gear housing portion 14B includes a plurality of alignment protrusions 210 that extend radially from the gear housing portion 14B. The removable head 18 includes a plurality of alignment recesses 212 that engage the plurality of alignment protrusions 210, when the removable head 18 is coupled to the ratchet tool 10D, such that the removable head 18 cannot rotate with respect to the gear housing portion 14B. Both the alignment protrusions 210 and the alignment recesses 212 are spaced apart symmetrically such that the removable head 18 may be attached to the gear housing portion 14B in a plurality of attachment orientations. The illustrated embodiment includes eight alignment protrusions and recesses 210, 212, corresponding to eight attachment orientations.

Figure 14A:
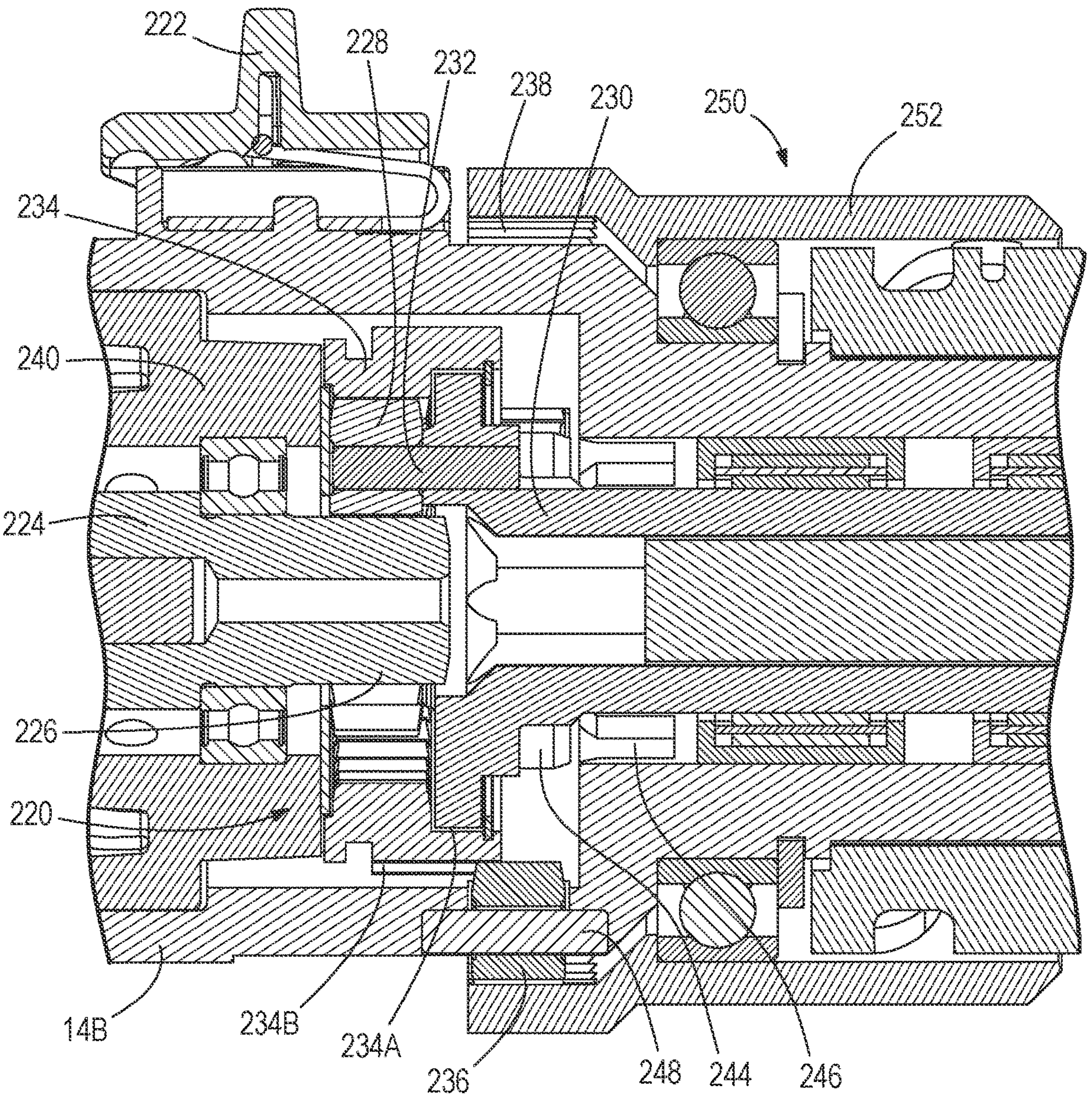
Figure 14B:
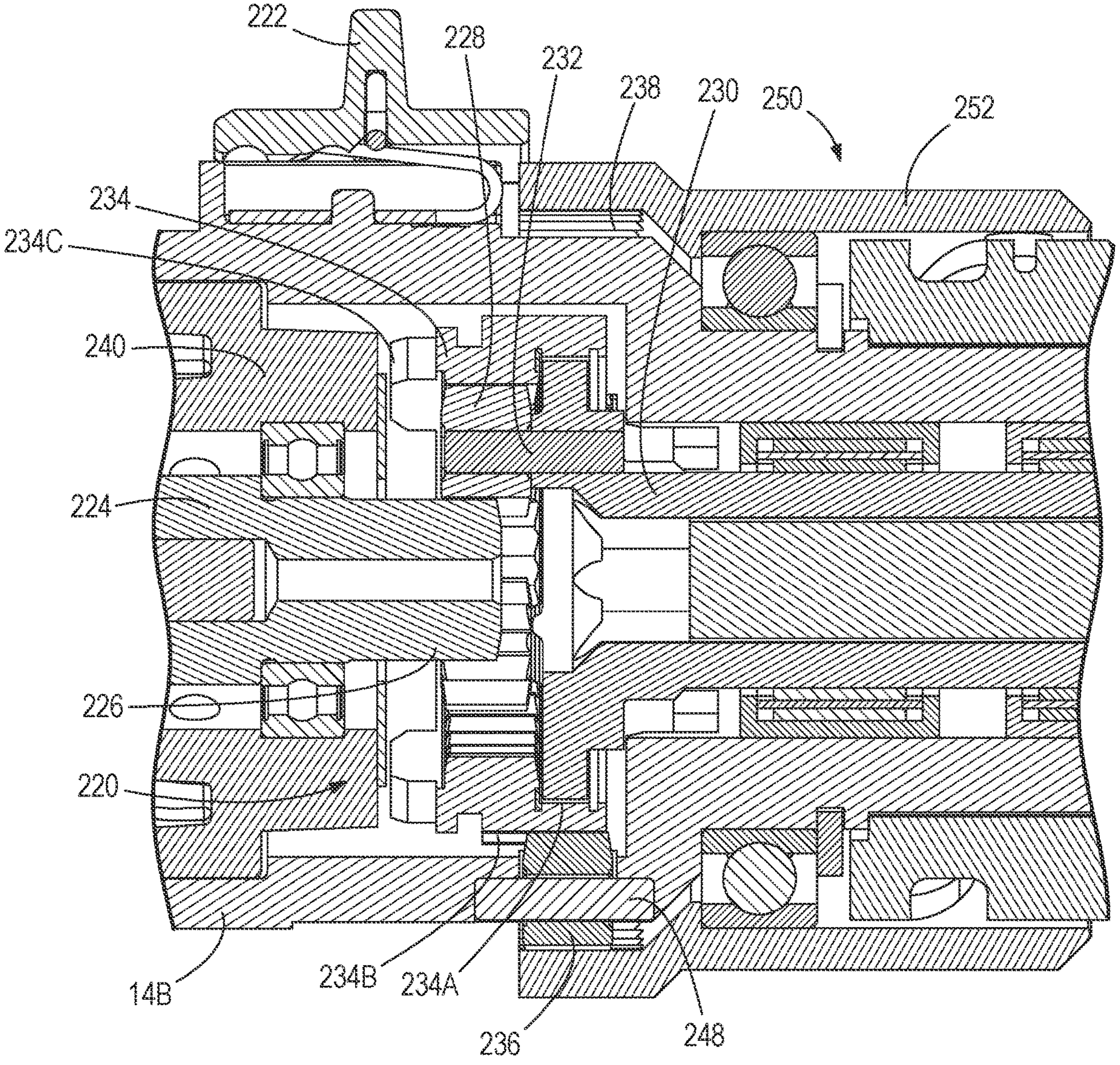

With reference to FIGS. 14A and 14B, the ratchet tool 10D includes a planetary transmission 220 that is shiftable, via a head release switch 222, between a first configuration (FIG. 14A) and a second configuration (FIG. 14B). When the head release switch 222 is in a first position, the transmission 220 is in the first configuration and drives the ratchet mechanism 31. When the head release switch 222 is in a second position, the transmission 220 is in the second configuration and drives the coupling mechanism 250 to couple or decouple the removable head 18 from the ratchet tool 10D, as described in greater detail below. The head release switch 222 thus functions as part of a mode change mechanism for shifting the transmission 220 between the first and second configurations.

Figure 15:
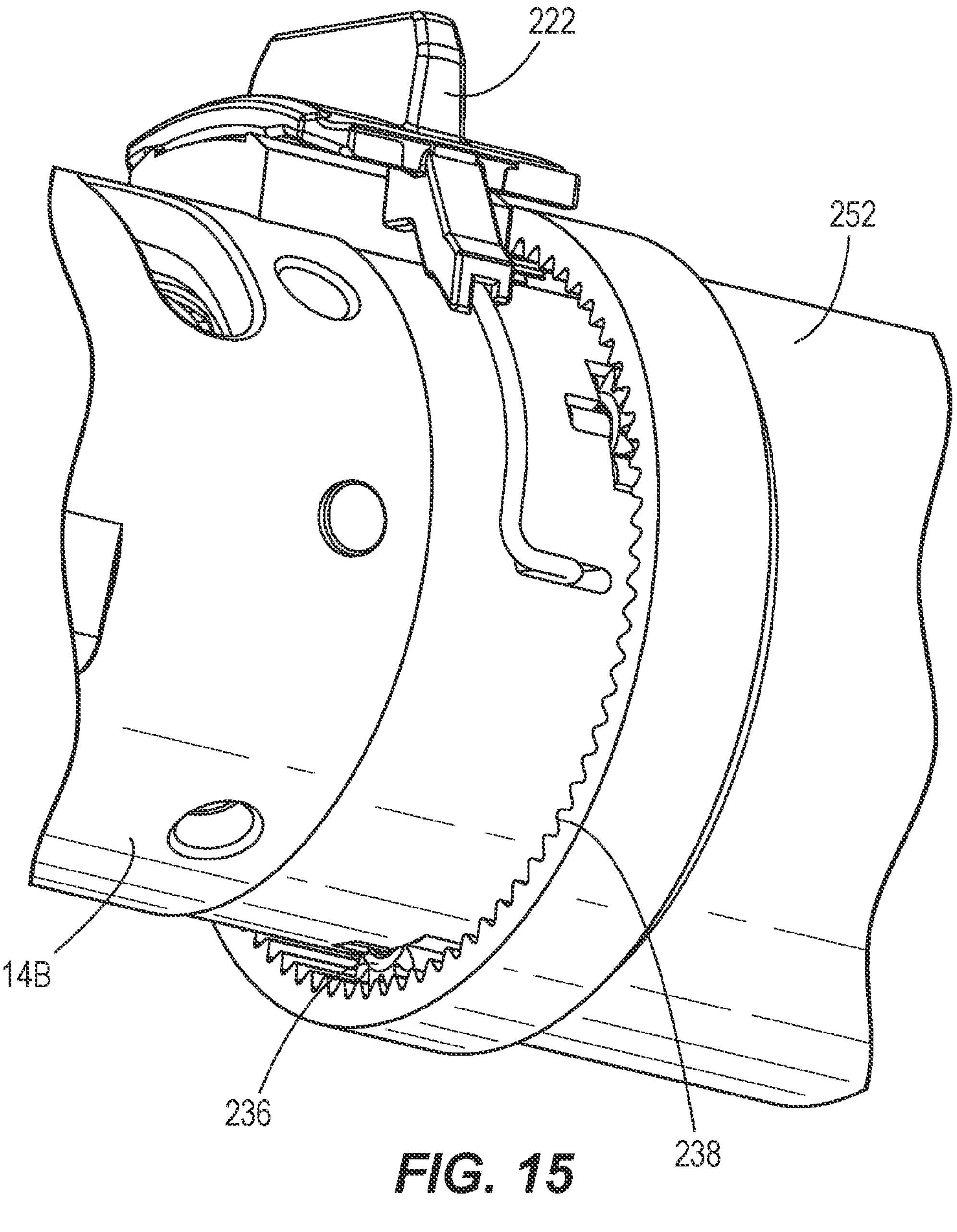
FIG. 15 is a perspective view of a collar of a coupling mechanism of the powered ratchet tool of FIGS. 12A-12B.

The illustrated coupling mechanism 250 includes a collar 252 that is rotatable about the first axis 30 and includes a geared portion 238 on an inner surface of the collar 252. As illustrated in FIG. 15, the geared portion 238 is driven by a second plurality of planetary gears 236 disposed within a wall of the gear housing portion 14B when the transmission 220 is in the second configuration.

Figure 16A:
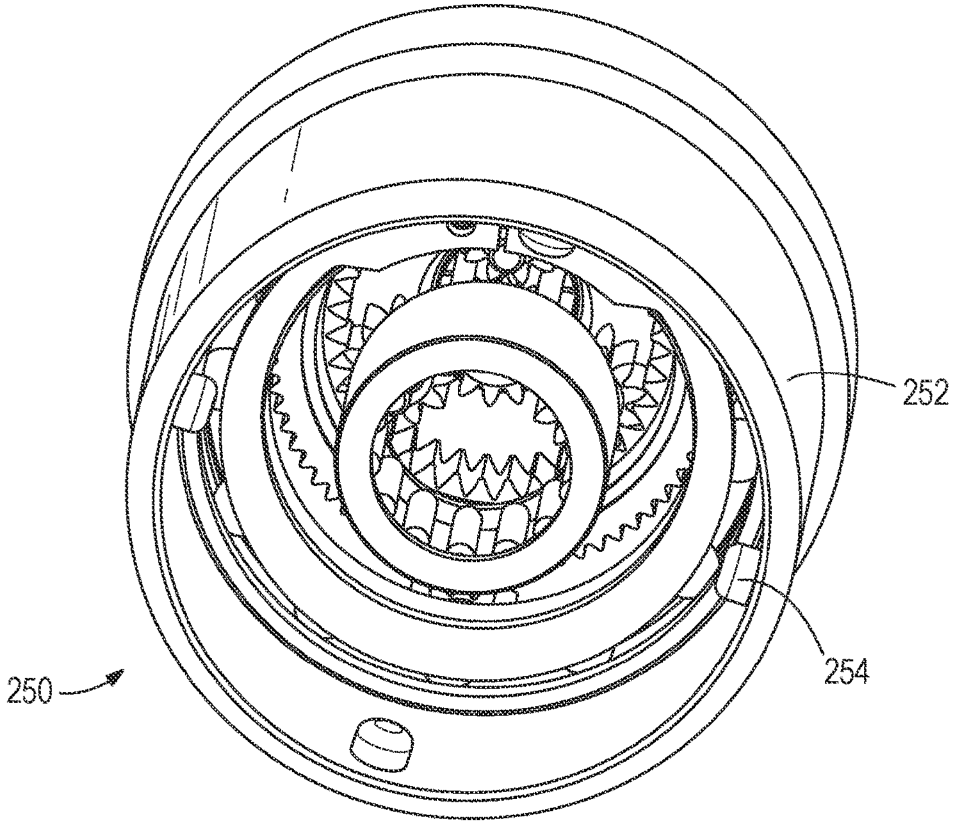
FIGS. 16A and 16B are perspective views of the coupling mechanism of the powered ratchet tool of FIGS. 12A-12B.
Figure 16B:
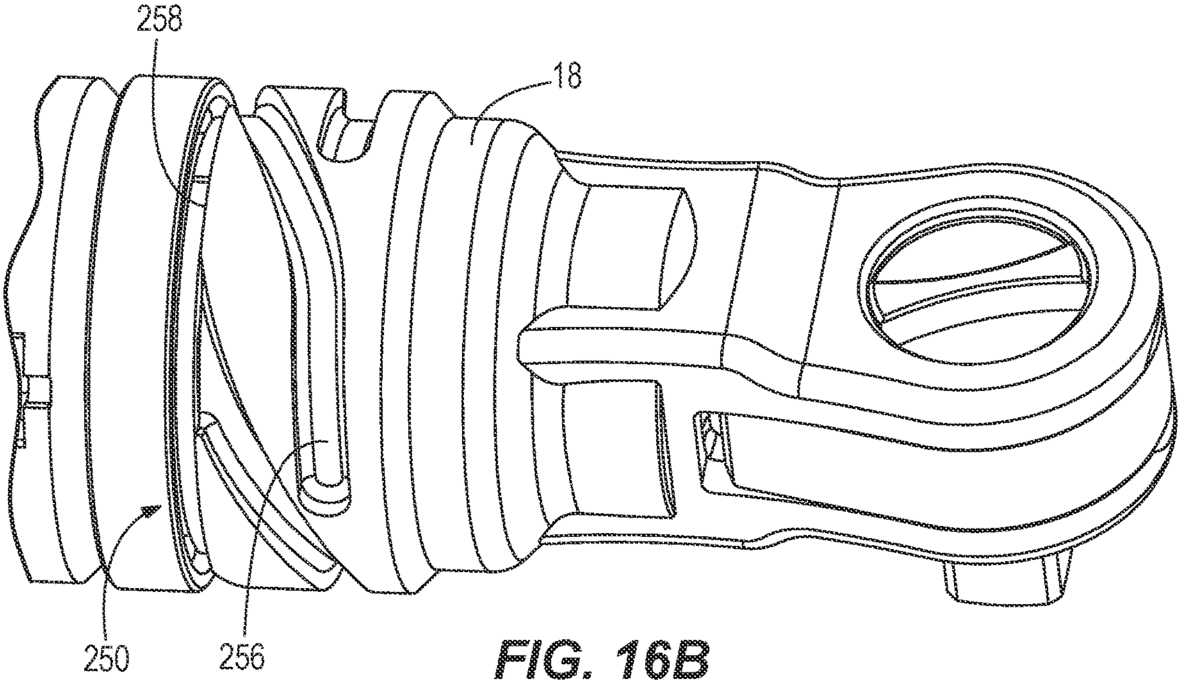

As shown in FIG. 16A, the collar 252 further includes a plurality of pins 254 (i.e., four in the illustrated embodiment) that extend radially inward from an inner surface of the collar 252. As shown in FIG. 16B, the removable head 18 includes a plurality of slots 256 (i.e., four in the illustrated embodiment) on an outer surface of the removable head 18 and sized to receive the plurality of pins 254. The slots 256 extend from a bottom rim 258 toward an opposite end of the removable head 18 and spiral circumferentially around the outer surface of the removable head 18. Accordingly, if the collar 252 is rotated while the pins 254 are received within the slots 256, the pins 254 move through the slots 256 toward or away from the bottom rim 258 such that the removable head 18 moves along the first axis 30 with respect to the collar 252.

Figure 17B:
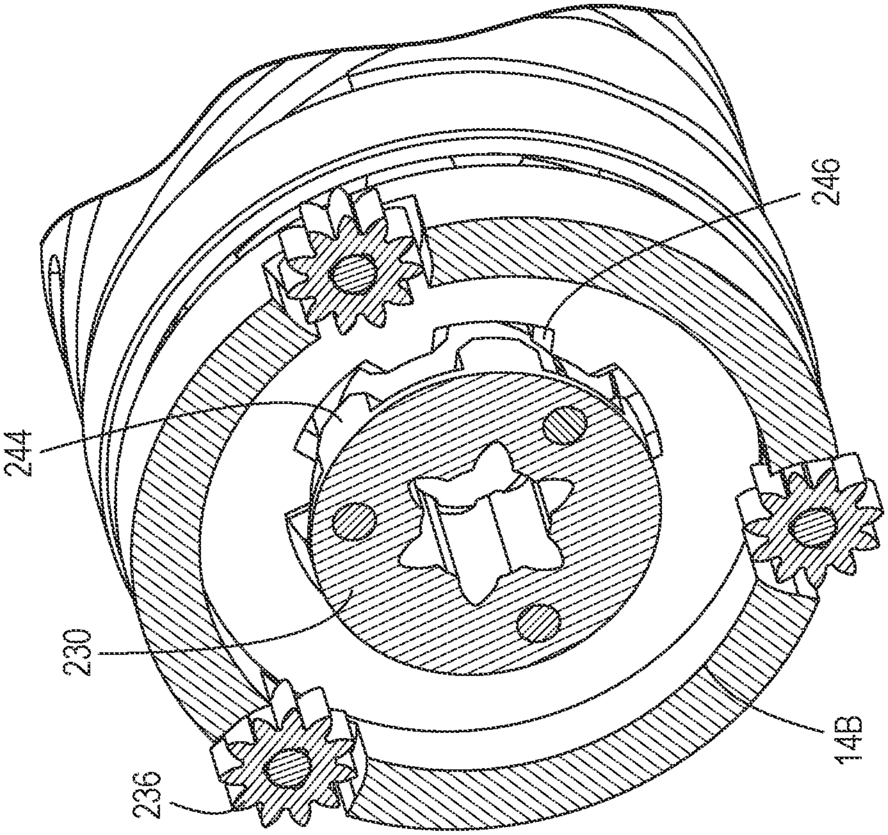
FIGS. 17A and 17B are perspective views of the planetary transmission and mode change mechanism of the powered ratchet tool of FIGS. 12A-12B.
Figure 17A:
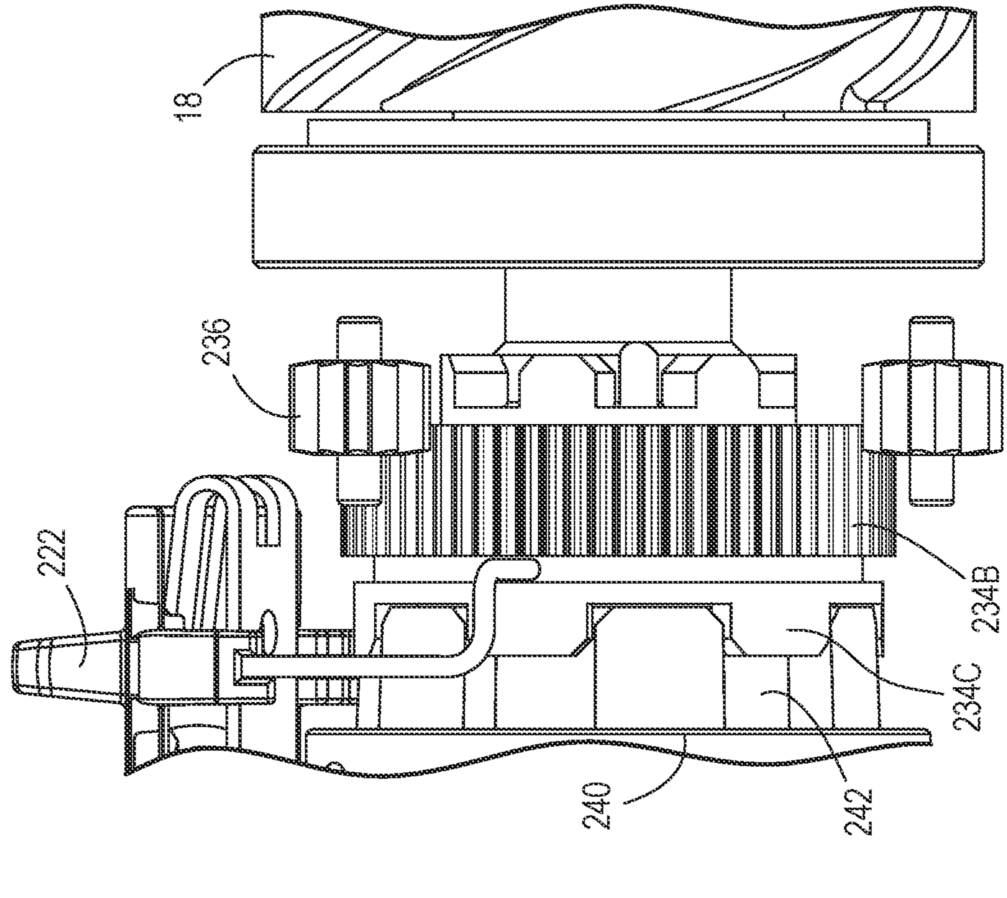

Referring back to FIGS. 14A and 14B, the transmission 220 includes an input shaft 224 driven by the motor 22, a pinion gear 226 coupled to the input shaft 224 for corotation therewith, a first plurality of planetary gears 228, an output shaft 230 to which the first plurality of planetary gears 228 are coupled via pins 232, a ring gear 234, the second plurality of planetary gears 236 coupled to the gear housing portion 14B via pins 248, and the geared portion 238 of the removable head 18. The ring gear 234 includes a first geared portion 234A on an inner surface, a second geared portion 234B on an outer surface, and a plurality of locking protrusions 234C. When the transmission 220 is in the first configuration, the plurality of locking protrusions 234C of the ring gear 234 engage with a plurality of locking recesses 242 of a flange 240 that is fixed to the gear housing portion 14B (FIG. 17A). As such, the ring gear 234 is fixed with respect to the gear housing portion 14B. When the input shaft 224 is driven by the motor 22, the pinion gear 226 drives the first plurality of planetary gears 228, which engage both the pinion gear 226 and the first geared portion 234A of the ring gear 234, such that the output shaft 230 rotates.

When the transmission 220 is in the second configuration, the locking protrusions 234C of the ring gear 234 are moved out of engagement with the locking recesses 242 of the flange 240 such that the ring gear 234 can rotate freely. Further, a plurality of locking protrusions 244 of the output shaft 230 are moved into engagement with a plurality of locking grooves 246 of the gear housing portion 14B such that the output shaft 230 is fixed with respect to the gear housing portion 14B (FIG. 17B). As such, when the input shaft 224 is driven by the motor 22, the first plurality of planetary gears 228 are driven to rotate the ring gear 234. The second geared portion 234B of the ring gear 234 engages the second plurality of planetary gears 236 which are rotated to drive the geared portion 238 of the collar 252.

In operation, the removable head 18 may be attached to the ratchet tool 10D as follows. First, the head release switch 222 may be moved into the second position to move the transmission 220 into the second configuration. The removable head 18 may then be inserted onto the ratchet tool 10D such that the plurality of alignment protrusions 210 of the gear housing portion 14B engage the plurality of alignment recesses 212 of the removable head 18, and the pins 254 of the collar 252 engage with the slots 256 of the removable head 18 at the bottom rim 258 of the removable head 18. The actuator 70 may then be activated to drive the collar 252 in a first direction to cause the pins 254 to move up the slots 256 of the removable head 18 and lock the removable head 18 into attachment with the ratchet tool 10D. The head release switch 222 can then be moved into the first position so that the motor 22 drives the ratchet mechanism 31 of the removable head 18. To release the removable head 18, the head release switch 222 may be moved back into the second position and the collar 252 may be driven in a second direction opposite the first direction to move the pins 254 along the slots 256 toward the bottom rim 258.

Various features and aspects of the present disclosure are set forth in the following claims.

What is claimed is:

1. A powered ratchet tool comprising:

a housing including a battery receptacle;

a motor disposed within the housing, the motor including an output spindle driven by the motor about a first axis;

a battery configured to be coupled to the battery receptacle to power the motor;

a head pivotably coupled to the housing, the head configured to pivot with respect to the housing about a second axis perpendicular to the first axis and between a plurality of discrete orientations, the head including a ratchet mechanism driven by the output spindle, and an output drive coupled to the ratchet mechanism and configured to rotate about an output drive axis; and a locking mechanism moveable between a first position, in which the head is locked in one of the plurality of discrete orientations with respect to the housing, and a second position, in which the head freely pivots between the plurality of discrete orientations about the second axis, wherein the locking mechanism includes a collar disposed around the housing, and wherein the plurality of discrete orientations includes a first orientation and a second orientation offset from the first orientation by 180 degrees.

2. The powered ratchet tool of claim 1, wherein the collar includes a protrusion configured to engage the head when the collar is in the first position.

3. The powered ratchet tool of claim 2, wherein the head includes a plurality of teeth and a plurality of grooves defined between each of the plurality of teeth, and wherein the protrusion of the collar engages one of the plurality of grooves when the collar is in the first position.

4. The powered ratchet tool of claim 1, wherein the collar is biased toward the first position.

5. The powered ratchet tool of claim 1, further comprising a gear assembly including:

an input shaft driven by the output spindle of the motor;

an input gear coupled for co-rotation with the input shaft;

an idler gear configured to engage the input gear to rotate about the second axis;

an output gear configured to engage the idler gear; and an output shaft coupled for co-rotation with the output gear such that the output shaft rotates about a third axis coaxial with the first axis to drive the ratchet mechanism to rotate the output drive about the output drive axis.

6. The powered ratchet tool of claim 5, wherein the input gear is slidable along the input shaft and coupled to the locking mechanism, and wherein movement of the locking mechanism from the first position to the second position moves the input gear out of engagement with the idler gear.

7. The powered ratchet tool of claim 5, wherein the input gear, the idler gear, and the output gear are bevel gears.

8. A powered ratchet tool comprising:

a housing having a motor housing portion and a gear housing portion;

a motor disposed within the motor housing portion, the motor including an output spindle driven by the motor about a first axis;

a head pivotably coupled to the gear housing portion, the head configured to pivot with respect to the gear housing portion about a second axis perpendicular to the first axis, the head including a ratchet mechanism driven by the output spindle, and an output drive coupled to the ratchet mechanism and configured to rotate about an output drive axis;

a gear assembly disposed in the gear housing portion, the gear assembly configured to transmit torque from the motor to the ratchet mechanism to rotate the output drive; and a collar disposed around the gear housing portion, the collar configured to engage the head to lock the head at a first discrete orientation with respect to the gear housing portion, wherein the collar is movable between a first position, in which the collar engages the head to lock the head in the first discrete orientation, and a second position, in which the collar disengages the head to allow the head to freely pivot about the second axis.

9. The powered ratchet tool of claim 8, wherein the head is movable to and lockable in a second discrete orientation offset from the first discrete orientation by 180 degrees.

10. The powered ratchet tool of claim 8, wherein the gear assembly includes an input shaft coupled to the output spindle for co-rotation, an output shaft configured to drive the ratchet mechanism and rotate about a third axis in response to rotation of the input shaft, and a gear portion disposed therebetween.

11. The powered ratchet tool of claim 10, wherein the gear portion includes an input gear coupled for co-rotation with the input shaft, an idler gear configured to engage the input gear and rotate about the second axis, and an output gear configured to engage the idler gear and couple the output shaft for co-rotation.

12. The powered ratchet tool of claim 11, wherein the input gear, the idler gear, and the output gear are bevel gears.

13. The powered ratchet tool of claim 11, wherein the collar is coupled to the input gear such that the input gear moves with the collar along the input shaft, and wherein the input gear engages the idler gear in the first position and disengages the idler gear in the second position.

14. The powered ratchet tool of claim 8, further comprising a biasing mechanism that biases the collar into the first position.

15. A method of locking a head of a powered ratchet tool in a discrete orientation with respect to a housing of the powered ratchet tool, the head configured to pivot with respect to the housing between a plurality of discrete orientations, the powered ratchet tool further including a locking mechanism including a collar disposed around the housing and movable between a first position and a second position, the method comprising:

biasing the collar into the first position to engage the head to lock the head at a first of the discrete orientations with respect to the housing;

moving the collar from the first position to the second position to disengage the head and allow the head to freely pivot with respect to the housing;

pivoting the head to a second of the discrete orientations with respect to the housing;

moving the collar from the second position to the first position such that the collar engages the head to lock the head at the second of the discrete orientations with respect to the housing.

16. The method of claim 15, wherein the head includes an engaging portion and the collar includes a protrusion, and wherein the step of biasing the collar includes engaging the protrusion of the collar with the engaging portion of the head.

17. The method of claim 16, wherein the step of moving the collar from the second position to the first position includes releasing the collar such that the collar is biased into the first position and the protrusion of the collar engages the engaging portion of the head.

18. The method of claim 15, wherein the locking mechanism further includes a biasing mechanism configured to bias the collar into the first position, and wherein moving the collar from the first position to the second position includes moving the collar against a biasing force of the biasing mechanism.

* * * * *